United States Patent
Arellano et al.

(10) Patent No.: US 10,878,351 B2
(45) Date of Patent: Dec. 29, 2020

(54) GLOBAL PRODUCTIVITY HUB TOOL

(71) Applicant: Accenture Global Solutions Limited, Dublin (IE)

(72) Inventors: Jonathan C. Arellano, Mandaluyong (PH); Thierry Charamel, Warsaw (PL); Maria Encarnacion P. Garcia, Manilla (PH); Paul P. Cantillan, Manilla (PH)

(73) Assignee: ACCENTURE GLOBAL SOLUTIONS LIMITED, Dublin (IE)

(*) Notice: Subject to any disclaimer, the term of this patent is extended or adjusted under 35 U.S.C. 154(b) by 747 days.

(21) Appl. No.: 14/991,604

(22) Filed: Jan. 8, 2016

(65) Prior Publication Data
US 2017/0200111 A1 Jul. 13, 2017

(51) Int. Cl.
*G06Q 10/06* (2012.01)
*H04L 12/26* (2006.01)

(52) U.S. Cl.
CPC ...... *G06Q 10/063114* (2013.01); *H04L 43/00* (2013.01); *H04L 43/065* (2013.01)

(58) Field of Classification Search
CPC .......... G06Q 10/06; G06Q 10/063114; G06Q 10/06311; G06Q 10/063; G06Q 10/0631; G06Q 10/0639; G06Q 10/06316; G06Q 10/103; G06Q 10/067; G06Q 10/06398; G06Q 10/00; G06Q 30/02; H04L 43/06
USPC .............................................. 705/7.11–7.42
See application file for complete search history.

(56) References Cited

U.S. PATENT DOCUMENTS

| | | | |
|---|---|---|---|
| 8,244,565 B2 | 8/2012 | Galvan | |
| 8,719,067 B2* | 5/2014 | Fama | G06Q 10/06 705/7.15 |
| 2002/0128895 A1* | 9/2002 | Broderick | G06Q 10/04 705/7.14 |
| 2005/0144022 A1* | 6/2005 | Evans | G06Q 10/06 705/7.42 |
| 2005/0183143 A1* | 8/2005 | Anderholm | G06F 11/32 726/22 |
| 2006/0184410 A1* | 8/2006 | Ramamurthy | G06Q 10/10 706/8 |

(Continued)

FOREIGN PATENT DOCUMENTS

| | | |
|---|---|---|
| CN | 101383030 A | 3/2009 |
| CN | 105229680 A | 1/2016 |
| WO | WO 2004/102320 A2 | 11/2004 |

OTHER PUBLICATIONS

Engineering Information Security: The Application of System Engineering Concepts to Achieve Assurance, Securing Management and Managing Security, Wiley-IEEE, First Edition, Chapter 12, pp. 607-656 (Year: 2011).*

(Continued)

*Primary Examiner* — Robert D Rines
(74) *Attorney, Agent, or Firm* — Brinks Gilson & Lione

(57) ABSTRACT

Methods and systems for creating and operating a web-based resource productivity tracking application are disclosed. The resource productivity tracking application enables monitoring of resource productivity efficiency metrics by receiving inputs of productivity efficiency targets. The resource productivity tracking application further receives information tracking the resource task allocations and activity allocations for determining capacity utilization, backlogs, critical queues and throughputs.

20 Claims, 31 Drawing Sheets

(56) References Cited

U.S. PATENT DOCUMENTS

| | | | | |
|---|---|---|---|---|
| 2007/0005374 A1* | 1/2007 | Harkin | ............. | G06Q 10/06 |
| | | | | 705/310 |
| 2010/0274611 A1* | 10/2010 | Kaufman | ............. | G06F 9/5061 |
| | | | | 705/7.11 |
| 2011/0010214 A1* | 1/2011 | Carruth | ............. | G06Q 10/06 |
| | | | | 705/7.26 |
| 2011/0302003 A1* | 12/2011 | Shirish | ............. | G06Q 10/0639 |
| | | | | 705/7.38 |
| 2012/0109795 A1 | 5/2012 | Sutherland | | |
| 2014/0032255 A1* | 1/2014 | Hegazi | ............. | G06Q 10/04 |
| | | | | 705/7.22 |
| 2014/0058801 A1* | 2/2014 | Deodhar | ............. | G06Q 10/0639 |
| | | | | 705/7.38 |
| 2014/0350985 A1* | 11/2014 | Pink | ............. | G06Q 10/063118 |
| | | | | 705/7.17 |
| 2017/0116552 A1* | 4/2017 | Deodhar | ............. | G06Q 10/06316 |

OTHER PUBLICATIONS

Office Action and Search Report in China Application No. 201611129250.0, dated Mar. 26, 2020, including English summary, 15 pages.

* cited by examiner

300 accentureoperations — Global Productivity Hub

| Home | User Activities | Dashboard | Metric Inputs | Reports | Configurations | Visuals | Welcome: John Doe | Log Off |

User Activities — NO ADDED WORK ITEM FOR NEXT ACTIVITY

TIME ELAPSED 00:00:00

DEAL EFFICIENCY 0.00%

TEAM EFFICIENCY 0.00%

WEDNESDAY 11/11/2015 | 3:31:15 PM 305  306  301

ADD WORK ITEM | PLAY | PAUSE | STOP | SAVE

302

TIME STARTED
AHT 00:15:00

EFFICIENCY 0.00% | UTILIZATION 0.00%

OPEN 45 | COMPLETED RECORD COUNT 0

303

COMPLETED VOLUME COUNT 0

PROD TIME 304 00:00:00

ADMIN TASK TIME 00:00:00

SHRINKAGE TIME 00:00:00

BREAK TIME 00:00:00

CURRENT | ACTIVITIES | FAVORITES

ACTIVITY TYPE: Productive
ACTIVITY NAME: 01 AAA & AAA
VOLUME: 1
STATUS: In Progress REFERENCE NUMBER
ADDITIONAL INFO
DEAL: Account/Deal ADDITIONAL DATE
TRANSACTION DATE
PROCESS: Process REMARKS
SUB PROCESS: Sub-Process TEAM: Team SP B Earliest Shift Start: 13:00
Shift End: 01:00

Productivity Tool

| accentureoperations | | | | | | Global Productivity Hub |
|---|---|---|---|---|---|---|
| Home | User Activities | Dashboard | Metric Inputs | Reports | Configurations | Visuals | Welcome: John Doe | Log Off |

Metric Input | Quality Metrics Upload | CU% Metrics Upload

Metric Input

501 — Team Quality
- Date: 11/11/2015
- Team Quality Score: 0.00
- Team: Accelerator Team

502 — Volume
- Date: 11/11/2015
- Inflow: 0
- Backlog: 0
- Critical Queue: 0
- Team: Accelerator Team

503 — SLA/Traget

| Metric | SLA/Target | Unit |
|---|---|---|
| Efficiency | 95.00 | % |
| Utilization | 76.00 | % |
| Equivalent Throughput Yield | 30.00 | % |
| Weighted Average Handling Time | 1.00 | hrs |
| Shrinkage% | 17.00 | % |
| Productive Hours | 6.50 | hrs |
| CU% (GPH Tracker) | 20.00 | % |
| Quality | 90.00 | % |
| Attendance | 90.00 | % |
| Overtime | 2.00 | hrs |
| Prod Hours % | 9.00 | % |

Productivity Tool

FIG. 5A

500 accentureoperations — Global Productivity Hub

| Home | User Activities | Dashboard | Metric Inputs | Reports | Configurations | Visuals | Welcome: John Doe | Log Off |

Metric Input | Quality Metrics Upload | CU% Metrics Upload

Quality Metrics Upload

511   512   513

| Upload Sheet | Uploaded | Skipped |

Date: 11/11/2015        Download Template

Select sheet: [        ] Browse...

[ Submit ]

| Statistics>> | Records in Mail Summary: | | | Uploaded: | Skipped: |

Productivity Tool

FIG. 5B

500 accentureoperations — Global Productivity Hub

| Home | User Activities | Dashboard | Metric Inputs | Reports | Configurations | Visuals |   Welcome: John Doe   [Log Off]

Metric Input | Quality Metrics Upload | CU% Metrics Upload

CU% Metrics Upload

521  522  523

| Upload Sheet | Uploaded | Skipped |

Date: 11/11/2015

Level: ○ Account/Deal  ○ Process  ○ Team  ● Agent

Select sheet: [_____] [Browse...]

[Submit]

Download Agent Template
Download Team Template
Download Process Template
Download Account Template

| Statistics>> | Records in Mail Summary: | | | Uploaded: | Skipped: |

Productivity Tool

| accentureoperations | | | | | | Global Productivity Hub |
|---|---|---|---|---|---|---|
| Home | User Activities | Dashboard | Metric Inputs | Reports | Configurations | Visuals | Welcome: John Doe | Log Off |

Main Reports | Dashboard Reports | Intraday Screen | Deal EOD Report | Mood Meter Report | Admin Report | Advanced Reporting

Report Generator

601 {
- Report List: [Select A Report]
- Agent: [Please Select Users]

602 {
- Date Comparison: [Transaction Date ▼]
- Date From: 11/11/2015
- Date To: 11/11/2015
- Time Zone: [UTC+08:00 ▼]
- 1.00

603:
- Organization: [All ▼]  Account/Deal: [All ▼]
- Geography En: [All ▼]  Process: [All ▼]
- Country En: [All ▼]  Sub-Process: [All ▼]
- SDO/Capability En: [All ▼]  Team: [All ▼]
- Reporting database was last updated on: 08/21/2015 23:17 local time
- Next Reporting database update: 01/01/0001 00:00 local time

[Generate] [Reset]

Productivity Tool

| accentureoperations | | | | | | | Global Productivity Hub |
|---|---|---|---|---|---|---|---|
| Home | User Activities | Dashboard | Metric Inputs | Reports | Configurations | Visuals | Welcome: John Doe  Log Off |

Organization Hierarchy | Organization Master List | Manage Users | Upload People HR Table | more »

Organization Hierarchy

Expand All    Collapse All

```
Organization
 └ Geography En
    └ Country En
       └ SDO/Capability En
          └ Account/Deal
             └ Process
                └ Sub-Process
                   └ Team
```

(+) Add Organization Hierarchy

| Edit | Organization Hierarchy | |
|---|---|---|
| ✎ | Organization | |

Productivity Tool

| | accentureoperations | | | | | Global Productivity Hub |
|---|---|---|---|---|---|---|
| Home | User Activities | Dashboard | Metric Inputs | Reports | Configurations Visuals | Welcome: John Doe  Log Off |

| Organization Hierarchy | Organization Master List | Manage Users | Upload People HR Table | more » |

Organization Master List

Expand All    Collapse All

```
⊟ Accenture
   ⊟ Geography
      ⊟ Country
         ⊟ Utilities/Capability
            ⊟ Meralco Deal
               ⊟ Meter Reading Process
                  ⊟ Meter Pullout Sub Process
                     - Shopko
                     - Replacement Team
                     - Woodside
                     - Meter Testing 2
                     - Edcon
                     - Procurement Team
                     - Shopko - Team B
                     - Pullout Team
                     - Google
                     - Meter Testing Team
```

(+) Add Organization

| Edit | Organization Name | Organization Parent | Organization Hierarchy | Active |
|---|---|---|---|---|
| ✏ | Accenture | | Organization | ☑ |

Productivity Tool

| accentureoperations | | | | Global Productivity Hub | |
|---|---|---|---|---|---|
| Home | User Activities | Dashboard | Metric Inputs | Reports | Configurations | Visuals | Welcome: John Doe | Log Off |

Organization Hierarchy | Organization Master List | Manage Users | Upload People HR Table | more »

Manage Productivity Tool Users

Users

| Enterprise ID | First Name | Last Name | Access Roles | Active |
|---|---|---|---|---|
| John Doe 1 | John | Doe 1 | Admin | ☑ |
| John Doe 2 | John | Doe 2 | Admin | ☑ |
| John Doe 3 | John | Doe 3 | Report Analyst | ☑ |
| John Doe 4 | John | Doe 4 | Admin | ☑ |
| John Doe 5 | John | Doe 5 | Admin | ☑ |
| John Doe 6 | John | Doe 6 | Agent | ☑ |
| John Doe 7 | John | Doe 7 | Admin | ☑ |
| John Doe 8 | John | Doe 8 | Admin | ☑ |
| John Doe 9 | John | Doe 9 | Admin | ☑ |
| John Doe 10 | John | Doe 10 | Admin | ☑ |
| John Doe 11 | John | Doe 11 | Admin | ☑ |
| John Doe 12 | John | Doe 12 | Admin | ☑ |
| John Doe 13 | John | Doe 13 | Admin | ☑ |
| John Doe 14 | John | Doe 14 | Admin | ☑ |
| John Doe 15 | John | Doe 15 | Admin | ☑ |
| John Doe 16 | John | Doe 16 | Admin | ☑ |
| John Doe 17 | John | Doe 17 | Admin | ☑ |
| John Doe 18 | John | Doe 18 | Admin | ☑ |
| John Doe 19 | John | Doe 19 | Admin | ☑ |
| John Doe 20 | John | Doe 20 | Admin | ☑ |

Search ⟳    |◁ ◁◁ Page [1] of 5 ▷▷ ▷|    View 1 - 20 of 98

[ Create New User ]  [ Back ]  [ Update ]

Productivity Tool

FIG. 7C

700 accentureoperations — Global Productivity Hub

| Home | User Activities | Dashboard | Metric Inputs | Reports | Configurations | Visuals | Welcome: John Doe | Log Off |

Organization Hierarchy : Organization Master List : Manage Users : Upload People HR Table : more »

Add/Edit User Information

General Information:

- *Sap Number: 98073216 ✓
- *Enterprise ID: John Doe 1 ✓
- *First Name: John
- *Last Name: Doe 1
- *Language: English

- Active ☑
- Report Activities ☑
- Report Attendance ☑

Organization Information:

- *Organization Role: Manager
- *Access Roles: Admin
- *Work Schedule: 11/4
- *Earliest Shift Start: 09:00:00
- *Shift End: 20:00:00
- *Shift Type: Day Shift
- *Login Threshold: 0
- *Time Zone: UTC+05:30 Chennai,
- *Team: Team B
- Sub Process: Test Sub
- Process: Process
- Account/Deal: Account/Deal
- SDO/Capability: SDO/Capability
- Country: Country
- Geography: Geography
- Organization: Accenture
- *Primary Team: Team B

[ Clear ] [ Save User Detail ] [ Back ]

Productivity Tool

FIG. 7D

700 accentureoperations — Global Productivity Hub

Home | User Activities | Dashboard | Metric Inputs | Reports | Configurations | Visuals — Welcome: John Doe | Log Off

Organization Hierarchy | Organization Master List | Manage Users | Upload People HR Table | more »

Upload People HR Table

Upload Sheet | Uploaded | Skipped

Select sheet: [_____ Browse...]    Download Template

[Submit]

Statistics » | Records in Mail Summary: | | Uploaded: | | Skipped: |

Productivity Tool

| accentureoperations | | | | | | Global Productivity Hub |
|---|---|---|---|---|---|---|
| Home | User Activities | Dashboard | Metric Inputs | Reports | Configurations | Visuals | Welcome: John Doe | Log Off |

Display : Display Configuration

Manage Display Configurations

Select Profile
[ Demo ▼ ]   [ Create New Profile ]   [ Cancel ]

Settings | Metrics

Profile Name: [Demo]

Display
☑ Process
☑ Team
☑ Agent

Time Interval [5] sec

Process
[ 1 selected ▼ ]

Team
[ 1 selected ▼ ]

Data Refresh Rate
[5] min

Time Zone
[ UTC+08:00 Beijing, Chongqing, Hong Kong SAR, Urumqi ▼ ]

[ Next ]

Productivity Tool

| Process 1 | 65<br>50 △<br>Equivalent Volume | 90%<br>90% ▽<br>Efficiency | 90%<br>80% △<br>Attendance |
|---|---|---|---|
| | 100%<br>90% ◁▷<br>Utilization (ACMS) | 100%<br>90% ◁▷<br>Productive Utilization | 50.23<br>100 △<br>AHT |
| | 80%<br>90% ▽<br>Quality | 100<br>100 ◁▷<br>Volume (Inflow) | 10<br>8 △<br>Volume (Backlog) |

Process Level

| Team 1 | 30<br>N/A △<br>Equivalent Volume | 80%<br>90% △<br>Efficiency | 95%<br>95% △<br>Attendance |
|---|---|---|---|
| | 95%<br>80% △<br>Utilization (ACMS) | 95%<br>80% △<br>Productive Utilization | 10<br>N/A △<br>AHT |
| | 80%<br>95% △<br>Quality | 100<br>N/A △<br>Volume (Inflow) | 20<br>N/A △<br>Volume (Backlog) |

Team Level

FIG. 9B

GLOBAL PRODUCTIVITY HUB TOOL

BACKGROUND

In an effort to understand the performance of their resources, a computer system may utilize resource productivity tracking applications for automatically tracking resources. However, resource productivity tracking applications that are executed on local computing environments do not have access to a network framework which prevents them from remotely tracking resources. Such resource productivity tracking applications also fail to allow computer systems to efficiently access and manage the resource tracking data to generate automated reports from remote locations. Therefore, a web-based resource productivity tracking application specifically configured to track resources and generate unique reports on utilization, backlogs, critical queues and throughputs is disclosed.

DESCRIPTION OF THE FIGURES

The present disclosure may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

FIG. 3A illustrates an exemplary user interface of a productivity tracking application operating according to a user activities module, according to some embodiments.

FIG. 3E illustrates an exemplary user interface of the productivity tracking application operating according to a user activities module, according to some embodiments.

FIG. 5A illustrates an exemplary user interface of the productivity tracking application operating according to a metric inputs module, according to some embodiments.

FIG. 5B illustrates an exemplary user interface of the productivity tracking application operating according to a metric inputs module, according to some embodiments.

FIG. 5C illustrates an exemplary user interface of the productivity tracking application operating according to a metric inputs module, according to some embodiments.

FIG. 6A illustrates an exemplary user interface of the productivity tracking application operating according to a reports module, according to some embodiments.

FIG. 6B illustrates an exemplary user interface of the productivity tracking application operating according to a reports module, according to some embodiments.

FIG. 6D illustrates an exemplary user interface of the productivity tracking application operating according to a reports module, according to some embodiments.

FIG. 6E illustrates an exemplary user interface of the productivity tracking application operating according to a reports module, according to some embodiments.

FIG. 6F illustrates an exemplary user interface of the productivity tracking application operating according to a reports module, according to some embodiments.

FIG. 7A illustrates an exemplary user interface of the productivity tracking application operating according to a configurations module, according to some embodiments.

FIG. 7B illustrates an exemplary user interface of the productivity tracking application operating according to a configurations module, according to some embodiments.

FIG. 7C illustrates an exemplary user interface of the productivity tracking application operating according to a configurations module, according to some embodiments.

FIG. 7D illustrates an exemplary user interface of the productivity tracking application operating according to a configurations module, according to some embodiments.

FIG. 7E illustrates an exemplary user interface of the productivity tracking application operating according to a configurations module, according to some embodiments.

FIG. 8 illustrates an exemplary user interface of the productivity tracking application operating according to a visuals module, according to some embodiments.

FIG. 9A illustrates an exemplary user interface of the productivity tracking application operating according to a visuals module, according to some embodiments.

FIG. 9B illustrates an exemplary user interface of the productivity tracking application operating according to a visuals module, according to some embodiments.

DETAILED DESCRIPTION

Figure 1:
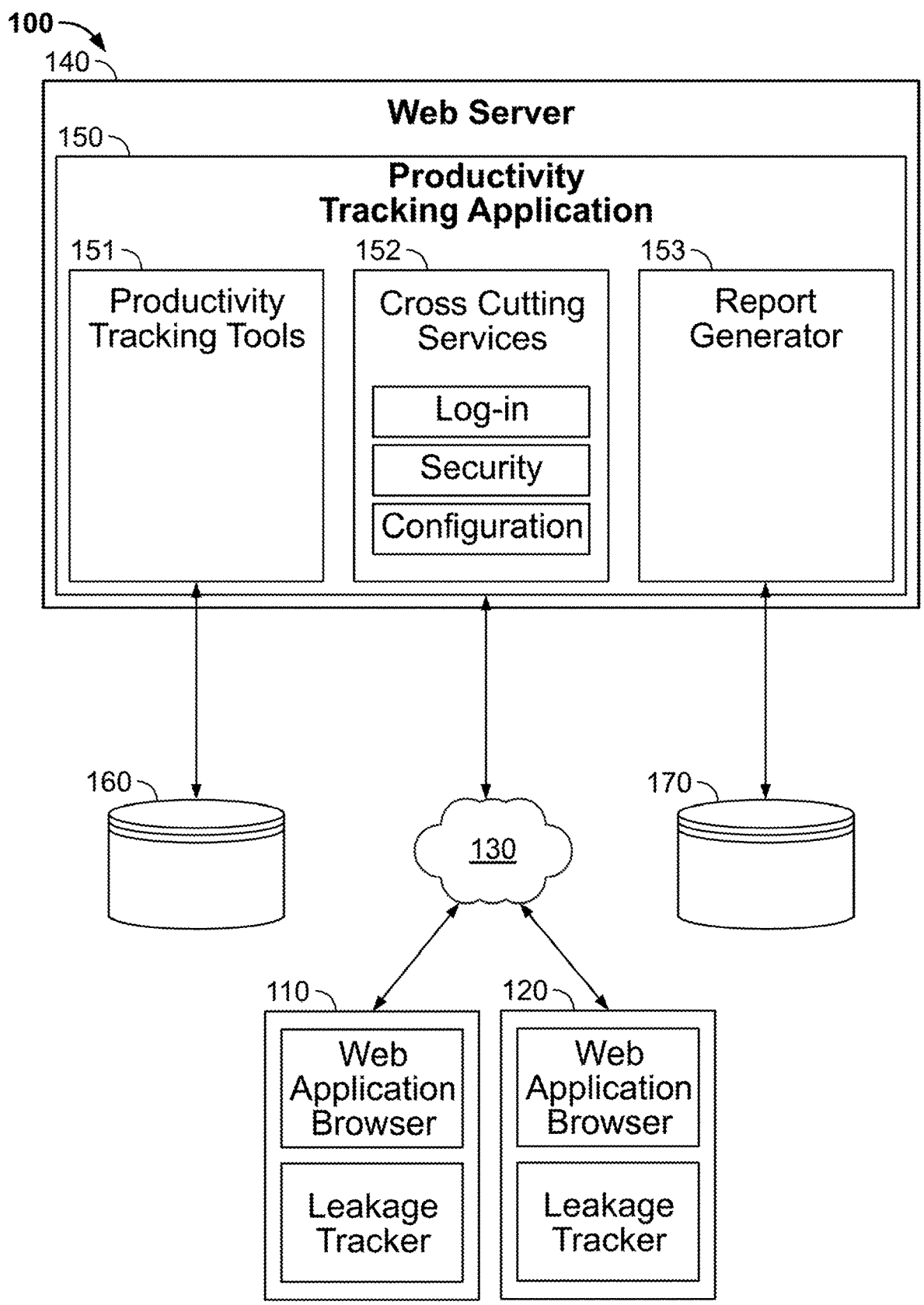
FIG. 1 illustrates an exemplary resource productivity tracking system, according to some embodiments.

The methods, devices, and systems discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described herein, including the addition, deletion, or rearranging an order of steps, may be made without departing from the spirit or scope of the claims as set forth herein.

A business organization includes complex computer structures that utilize various resources to ensure that the business organization is able to successfully perform its defined business processes and goals. The resources utilized may include, financial resources, physical resources, intellectual resources, computing resources, sales resources, computer storage resources (e.g., cloud computing), manufacturing resources, and worker resources (e.g., employees or agents) available to the business organization.

It is important to accurately keep track of resources to determine if the resources are being effectively utilized, and to determine the productivity of the resources being utilized. By accurately tracking resources, business issues may be accurately identified so that resources may be better managed and run efficiently. In many cases, the ability to accurately track business resources is the foundations for allowing a business organization to run efficiently and ultimately save on the spending of their resources.

In one exemplary embodiment, tracking the productivity of human resources within the business organization is important to understand where efficiencies may be gained or lost. However, tracking the productivity of human resources has traditionally been difficult when relying purely on self-reporting methods. For example, in many cases it may be difficult for an agent to self-report their work productivity without losing their ability to be efficient.

It is within this context that a global resource productivity hub tool is disclosed for enabling a business organization to effectively and accurately track their business resources without losing efficiencies. The global resource productivity hub tool is directed to systems, devices, and methods for tracking resource allocations and generating resource productivity performance metrics based on the tracked activities. The global resource productivity hub tool may be configured as a technical solution for efficiently tracking resource productivity, efficiently and utilization and redistributing resource allocations to improve productivity. The global resource productivity hub may be embodied as a resource productivity tracking application established over a web-based platform to enable a system to receive inputs of the resource task and activity information, and enable authorized remote systems to remotely access the resource productivity tracking application to generate resource productivity performance metrics in real-time, or near real-time. By being structured within the web-based platform, the global resource productivity hub tool enables remote systems to input and request information in real-time, or near real-time, to facilitate improved resource efficiency and utilization.

According to some aspects, a resource tracking server is disclosed. The productivity tracking server may comprise an interface configured to communicate with a user device, a memory configured to store resource productivity target information and instructions for running a resource productivity tracking application, and a processor configured to communicate with the interface and the memory. The processor may further be configured to execute the instructions for running the resource productivity tracking application to receive an access request from the user device, the access request including access level information corresponding to a resource, determine an access level for the resource based on the access level information, receive, from the user device, resource tracking information corresponding to the resource, control storage of the resource tracking information in the memory, determine whether to enable generation of a productivity report for the resource based on the access level for the resource, in response to determining generation of the productivity report is enabled, generate the productivity report based on the resource tracking information and the resource productivity target information, and control the interface to transmit the productivity report to the user device, wherein the productivity report includes instructions for controlling display of the productivity report on the user device.

According to some aspects, a method of tracking resource productivity is disclosed. The method may comprise receiving an access request to access a resource productivity tracking application from a user device, the access request including access level information and authentication information corresponding to a resource, enabling access to the resource productivity tracking application based on the authentication information, determining an access level for the resource based on the access level information, receiving, from the user device, resource tracking information corresponding to the resource, controlling storage of the resource tracking information in a memory, determining whether to enable generation of a productivity report for the resource based on the access level for the resource, in response to determining generation of the productivity report is enabled, generating the productivity report based on the resource tracking information and resource productivity target information, and controlling transmission of the productivity report to the user device, wherein the productivity report includes instructions for controlling display of the productivity report on the user device.

According to some aspects, a resource tracking system is disclosed. The resource tracking system may comprise a communication device configured to receive resource tracking information corresponding to a resource. The productivity tracking system may further comprise a productivity tracking server configured to communicate with the communication device and a database. The productivity tracking server may be further configured to receive resource tracking information from the communication device, control storage of the resource tracking information in the database, generate a productivity report for the resource based on the resource tracking information and productivity target information, and control transmission of the productivity report to the communication device, wherein the productivity report includes instructions for controlling display of the productivity report on the communication device.

FIG. 1 illustrates exemplary system architecture for communication network system 100 that includes component devices for implementing features of the global productivity hub tool described herein. The communication network system 100 includes a web server 140 operating, for example, according to a .NET framework. Web server 140 may be further configured to include and/or communicate with an application server 150, where the application server stores and runs the productivity tracking application as part of the global productivity hub tool.

The productivity tracking application may include a set of productivity tracking tools 151 configured to receive, store, and analyze resource tracking data, as described in more detail throughout this disclosure. For example, the productivity tracking tools 151 may correspond to the operating modules of the productivity tracking application described herein. The resource tracking data referenced by the productivity tracking tools 151, and/or data generated by the productivity tracking tools 151 may be stored in database server 160. In addition or alternatively, resource tracking data referenced by the productivity tracking tools 151 may be obtained through network 130 from inputs to the productivity tracking application by users (e.g., users operating agent device 110 or manager device 120).

The productivity tracking application may further include a report generator 153 configured to generate reports based on the resource tracking data obtained from the productivity tracking tools 151. The report generator 153 may store generated reports on a reporting server 170, as described in more detail throughout this disclosure. Data stored on database server 160 and/or reporting server 170, as described herein, may be aggregated, archived, and/or deleted periodically. For example, such information may be aggregated, archived, and/or deleted periodically based on a corresponding account size.

The productivity tracking application may further include cross cutting services 152 configured to control access and configuration of the productivity tracking application, as described in more detail throughout this disclosure. Application server 150 and/or web server 140 may communicate with database server 160 and/or reporting server 170 according to known wired or wireless communication protocols, some of which are described herein.

According to the exemplary system architecture of the communication network system 100 illustrated in FIG. 1, both the agent device 110 and the manager device 120 may access the productivity tracking application through network 130 to execute features of the productivity tracking application.

For example, a user (e.g., an agent operating the agent device 110) may initiate a web application browser running on agent device 110 to request access to the productivity tracking application. The cross cutting services 152 of the productivity tracking application may receive the access request and determine whether to allow access, and if so, what level of access to allow the user. The cross cutting services 152 is configured to control access to the productivity tracking application. For example, the cross cutting services 152 may control a log-in process and a security protocol process of the productivity tracking application. The cross cutting services may also control a configuration process for allowing users with the appropriate access level to configure aspects of the productivity tracking application. According to some embodiments, the cross cutting services 152 may identify a specific number of roles for users of the productivity tracking application, and assign each role a predetermined access level. For example, the cross cutting services 152 may identify a user of the productivity tracking application as an agent, a report analyst, a team leader, manager, or an administrator based on the credentials identified within the access request during a log-in process. Each role may be assigned predefined access levels that enables the user access to certain productivity tracking tools and the ability to configure the productivity tracking application. The access levels themselves may be set or configured by, for example, users having an administrator level access, while users having a team leader or administrator level access may be allowed to upload access roles. In addition to the web application browser, the agent device 110 may include a leakage tracker configured to detect and track leakage of data being communicated between agent device 110 and web server 140 during operation of the productivity tracking application.

It follows that in response to receiving the access request from the user, the cross cutting services 152 may allow the user access to the productivity tracking application based on authentication information included in the access request as part of a log-in process. Once access has been granted, the cross cutting services 152 may further determine an access level (e.g., agent level, report analyst level, team leader level, or administrator level) of the user based on information included in the access request, and assign the user the appropriate access level which will enable the user to utilize certain features of the productivity tracking application based on the assigned access level. Therefore, certain features of the productivity tracking application may be made available and/or restricted to the user based on the determined access level. The authentication log-in process may be implemented using active directory federation services (ADFS).

According to some embodiments, the authentication information may further associate the user with one or more clients. For example, when the business organization assigns the user to work on assignments for one or more specified clients, the authentication information for the user may identify such clients assigned to the user. Client information corresponding to the assigned clients may also be stored in, for example, database server 160 and/or reporting server 170. In order to provided additional security, database server 160 and/or reporting server 170 may further employ the use of a Master Key and Certificates in encrypting and decrypting access to multiple client databases such that the authentication information will include the proper certificates to enable access to client information stored on database server 160 and/or reporting server 170 for clients assigned to the user.

Once access to the productivity tracking application is authorized and the appropriate access level is assigned to the user by the cross cutting services 152, the application browser running on agent device 110 may receive information from application server 150 that enables the application browser to run features of the productivity tracking application on agent device 110 as described in further detail herein. According to some embodiments, portions of the productivity tracking application may be stored in cache memory on the agent device 110, web server 140, application server 150, and/or database server 160. For example, a user session may be created upon successfully authenticating the user by the cross cutting services 152, where the user session may identify attributes of the user and usage history data that identifies features of the productivity tracking application utilized by the user. The user session information may then be stored in cache memory to allow for faster authentication of the user and/or faster initialization of the productivity tracking application for a subsequent access to the productivity tracking application by the user.

Similarly, the user may be a manager operating the manager device 120 to request access to the productivity tracking application. The manager may be subject to the same authentication log-in process described above, where in this case the cross cutting services 152 will identify the user as a manager and assign the user manager level access to the productivity tracking application. According to some embodiments, the manager level access enables the user to input productivity target information and generate agent work productivity reports, as described in more detail herein.

Embodiments of the agent device 110 and the manager device 120 may include well known computing systems, environments, and/or configurations that may be suitable for implementing features of the global productivity hub tool such as, but are not limited to, smart phones, tablet computers, personal computers (PCs), server computers, handheld or laptop devices, multiprocessor systems, microprocessor-based systems, network PCs, minicomputers, mainframe computers, embedded systems, distributed computing environments that include any of the above systems or devices, and the like. Further, each of the agent device 110, manager device 120, web server 140, application server 150, database server 160, and/or reporting server 170 may include one or more components of computer 200 illustrated in FIG. 2.

Figure 2:
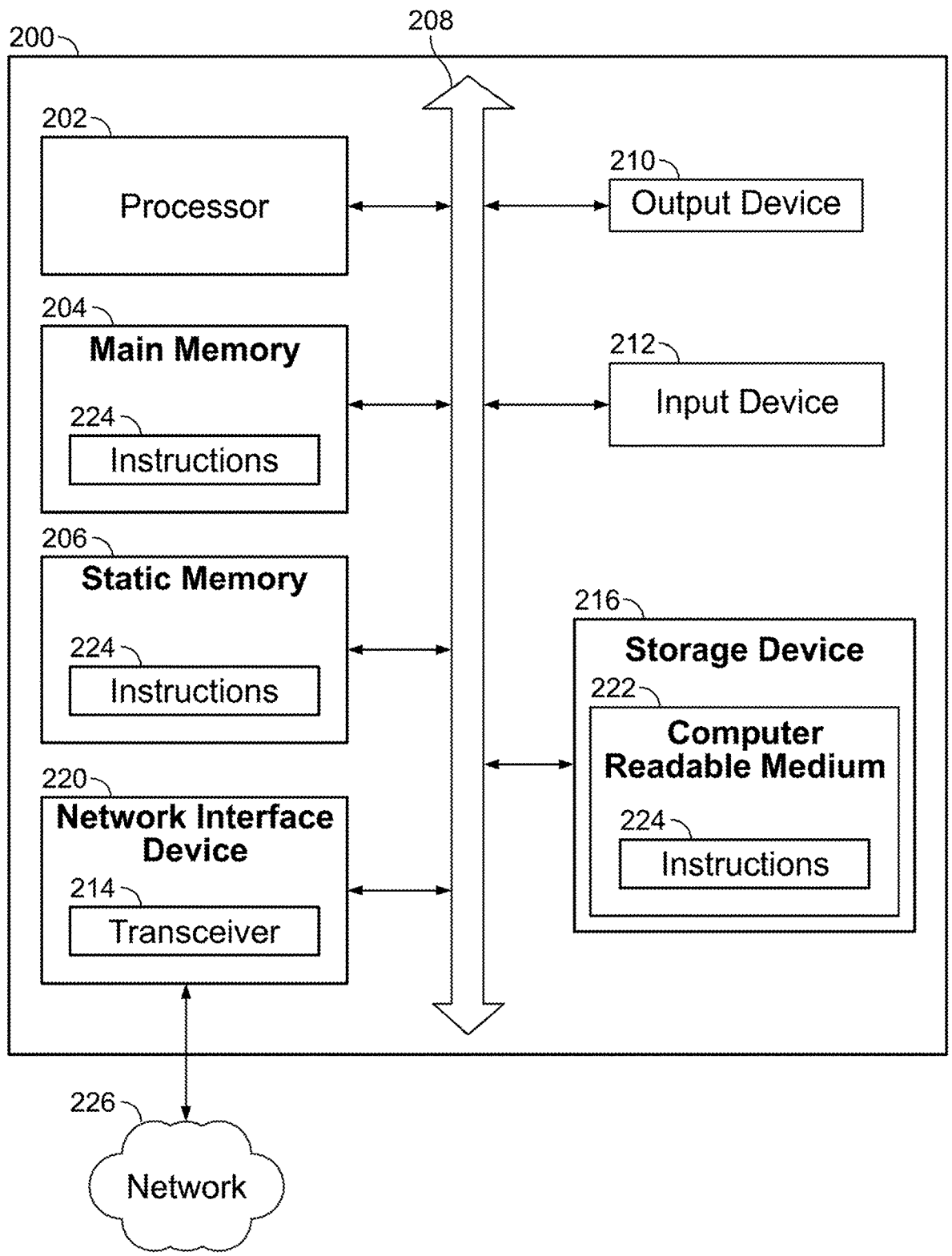
FIG. 2 illustrates a block diagram of an exemplary computer architecture for a device in the resource productivity tracking system illustrated in FIG. 1.

FIG. 2 illustrates exemplary computer architecture for computer 200. Computer 200 includes a network work interface 220 that enables communication with other computers via a network 226, where network 226 may be represented by network 130 in FIG. 1. The computer 200 may include a processor 202, a main memory 204, a static memory 206, the network interface device 220, an output device 210 (e.g., a display or speaker), an input device 212, and a storage device 216, all connected via a bus 208.

The processor 202 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 202 executes instructions and includes portions of the computer 200 that control the operation of the entire computer 200. The processor 202 may also represent a controller that organizes data and program storage in memory and transfers data and other information between the various parts of the computer 200.

The processor 202 is configured to receive input data and/or user commands from the input device 212. The input device 212 may be a keyboard, mouse or other pointing device, trackball, scroll, button, touchpad, touch screen, keypad, microphone, speech recognition device, video recognition device, or any other appropriate mechanism for the user to input data to the computer 200 and control operation of the computer 200 and/or operation of the productivity tracking tools described herein. Although only one input device 212 is shown, in another embodiment any number and type of input devices may be included. For example, input device 212 may include an accelerometer, a gyroscope, and a global positioning system (GPS) transceiver.

The processor 202 may also communicate with other computers via the network 226 to receive instructions 224, where the processor may control the storage of such instructions 224 into any one or more of the main memory 204, such as random access memory (RAM), static memory 206, such as read only memory (ROM), and the storage device 216. The processor 202 may then read and execute the instructions 224 from any one or more of the main memory 204, static memory 206, or storage device 216. The instructions 224 may also be stored onto any one or more of the main memory 204, static memory 206, or storage device 216 through other sources. The instructions 224 may correspond to, for example, instructions that make up the productivity tracking application described herein.

Although computer 200 is shown to contain only a single processor 202 and a single bus 208, the disclosed embodiment applies equally to computers that may have multiple processors and to computers that may have multiple busses with some or all performing different functions in different ways.

The storage device 216 represents one or more mechanisms for storing data. For example, the storage device 216 may include a computer readable medium 222 such as read-only memory (ROM), RAM, non-volatile storage media, optical storage media, flash memory devices, and/or other machine-readable media. In other embodiments, any appropriate type of storage device may be used. Although only one storage device 216 is shown, multiple storage devices and multiple types of storage devices may be present. Further, although the computer 200 is drawn to contain the storage device 216, it may be distributed across other computers, for example on a server.

The storage device 216 may include a controller (not shown) and a computer readable medium 222 having instructions 224 capable of being executed by the processor 202 to carry out the functions as previously described herein with reference to the productivity tracking application. In another embodiment, some or all of the functions are carried out via hardware in lieu of a processor-based system. In one embodiment, the controller is a web browser, but in other embodiments the controller may be a database system, a file system, an electronic mail system, a media manager, an image manager, or may include any other functions capable of accessing data items. The storage device 216 may also contain additional software and data (not shown), which is not necessary to understand the invention.

Output device 210 is configured to present information to the user. For example, the output device 210 may be a display such as a liquid crystal display (LCD), a gas or plasma-based flat-panel display, or a traditional cathode-ray tube (CRT) display or other well-known type of display in the art of computer hardware. Accordingly, in some embodiments the output device 210 displays a user interface. In other embodiments, the output device 210 may be a speaker configured to output audible information to the user. In still other embodiments, any combination of output devices may be represented by the output device 210.

Network interface device 220 provides the computer 200 with connectivity to the network 226 through any suitable communications protocol. The network interface device 220 sends and/or receives data from the network 226 via a wireless or wired transceiver 214. The transceiver 214 may be a cellular frequency, radio frequency (RF), infrared (IR) or any of a number of known wireless or wired transmission systems capable of communicating with a network 226 or other computer device having some or all of the features of computer 200. Bus 208 may represent one or more busses, e.g., USB, PCI, ISA (Industry Standard Architecture), X-Bus, EISA (Extended Industry Standard Architecture), or any other appropriate bus and/or bridge (also called a bus controller).

Computer 200 may be implemented using any suitable hardware and/or software, such as a personal computer or other electronic computing device. In addition to the various types of wearable devices described herein, computer 200 may also be a portable computer, laptop, tablet or notebook computer, PDA, pocket computer, appliance, telephone, or mainframe computer. Network 226 may be any suitable network and may support any appropriate protocol suitable for communication to the computer 200. In an embodiment, network 226 may support wireless communications. In another embodiment, network 226 may support hard-wired communications, such as a telephone line or cable. In another embodiment, network 226 may support the Ethernet IEEE (Institute of Electrical and Electronics Engineers) 802.3x specification. In another embodiment, network 226 may be the Internet and may support IP (Internet Protocol). In another embodiment, network 226 may be a LAN or a WAN. In another embodiment, network 226 may be a hotspot service provider network. In another embodiment, network 226 may be an intranet. In another embodiment, network 226 may be a GPRS (General Packet Radio Service) network. In another embodiment, network 226 may be any appropriate cellular data network or cell-based radio network technology. In another embodiment, network 226 may be an IEEE 802.11 wireless network. In still another embodiment, network 226 may be any suitable network or combination of networks. Although one network 226 is shown, in other embodiments any number of networks (of the same or different types) may be present.

The productivity tracking application described herein is configured to track attendance of agents based on a log-in time of agents into the productivity tracking application. The productivity tracking application is also configured to track agent activities based on activity information logged into the productivity tracking application by agents. The productivity tracking application is also configured to track an agent's idle time spent during each work task activity, which in turn enables the productivity tracking application to identify specific leakage points throughout a work day where the agent is not being productive on their work task activity. The productivity tracking application is configured to generate near real time agent productivity metrics in the form of reports and dashboards for managers to review through the web. Because of the web-based platform of the productivity tracking application, agents are able to access the productivity tracking application to input information in real time, or near real time, and likewise managers are able to access the productivity tracking application to generate productivity reports and dashboards in real time, or near real time. An added benefit of the web-based platform is the ability of both agents and managers to access the productivity tracking application from remote locations as long as they have access to a network in communication with the web server 140 hosting the productivity tracking application. Further detailed descriptions of the features enabled by the productivity tracking application are provided throughout this disclosure.

FIG. 3A illustrates an exemplary user interface 300 of the productivity tracking application that may be displayed on a user's device (e.g., agent device 110 or manager device 120) after successfully logging onto the productivity tracking application (i.e., successfully passing authentication process). The productivity tracking application may be comprised of a plurality of operating modules (i.e., productivity tracking tools) which are visually represented by the following main topic tabs: home main topic tab, user activities main topic tab, dashboard main topic tab, metric inputs main topic tab, reports main topic tab, configurations main topic tab, and visuals main topic tab. Each of the exemplary main topic tabs are illustrated along the top of user interface 300.

As illustrated by the indicated selection of the "user activities" main topic tab in FIG. 3A, user interface 300 corresponds to the user activities module. User interface 300 displays activity tracking information of a user (e.g., agent, manager, team leader, administrator) that has been identified by the productivity tracking application through a logging on authentication procedure. According to some embodiments, only administrators, team managers, and agents may access the user interface 300 corresponding to the user activities module. Information gathered by user inputs on the user interface 300 will be stored on a database in communication with the productivity tracking application such as, for example, database server 160.

Provided on user interface 300, there are included timer controls 301 (e.g., play button, pause button, stop button, save button), sub-operating tabs 302 (e.g., current tab, activities tab, favorites tab), tracking metrics table 303, sub-operating interface 304 corresponding to the "current" sub-operating tab identified from the sub-operating tabs 302, deal efficiency tracker 305, and team efficiency tracker 306.

The user (e.g., agent) operating user interface 300 may identify their current work task activity by selecting from preset activity data and/or manually inputting self-reporting information. For example, the current work task activity may be identified according to the following attributes that may be identified from the "current" sub-operating tab from sub-operating tabs 302: an activity type selection option (e.g., productive, shrinkage, break, admin task), an activity name selection option (e.g., 01 AAA & AAA), a volume amount input option (i.e., number of times the specific work task will be repeated), and a status selection option (e.g., in progress). By inputting this information, the user may identify a current work task activity for tracking by the productivity tracking application. It should be noted that only the productive activity type may be counted as a work task activity when calculating efficiency or utilization, as described in more detail herein.

The sub-operating interface 304 corresponding to the "current" sub-operating tab may further include a reference number input option for identifying the current client and/or matter assigned to the current work task activity that has been identified. The "current" sub-operating tab may further include an additional information input option for inputting additional information related to the current work task activity, an additional date input option for identifying dates related to the current work task activity, a transaction date input date for identifying the date of the current work task activity, and a remarks input option for identifying notes related to the current work task activity. The "current" sub-operating tab may further include a deal selection option for identifying the type of deal (e.g., account/deal) the current work task activity may be categorized under, a process selection option for identifying the type of process (e.g., process) the current work task activity may be categorized under, a sub process selection option for identifying the type of sub process (e.g., sub-process) the current work task activity may be categorized under, and a team selection option for identifying the team (e.g., team SP B) the user is currently assigned to for completing the current work task activity.

After identifying the current work task activity, or according to some embodiments before identifying the current work task, the user may provide control inputs to the timer controls 301 (e.g., play button, pause button, stop button, save button) to keep track of time worked on the current work task activity. For example, the user may select the "play" control to begin a stop watch function. The user may later select the "pause" control to pause the stop watch function. The user may also select the "stop" control to stop the stop watch function. The user may also select the "save" control to save time calculated by the stop watch function to the current work task activity identified from inputs and selections made into the sub-operating interface 304 corresponding to the "current" sub-operating tab. The time tracked by the stop watch function may be displayed in the tracking metrics table 303.

The tracking metrics table 303 may include a time elapsed display that identifies the time tracked by the stop watch function. The tracking metrics table 303 may also include an average handle time (AHT) display that identifies the average time it takes the user to complete the activity identified as the current work task activity. The tracking metrics table 303 may also include an efficiency metric display that identifies an efficiency of the user for completing the activity identified as the current work task. The tracking metrics table 303 may also include a utilization metric display that identifies a utilization of the user. The tracking metrics table 303 may also include a completed volume count display that identifies a number of completed work task activities accomplished by the user for the activity identified as the current work task activity. The tracking metrics table 303 may also include a production time display that identifies a total time spent by the user for completing the activity identified as the current work task work task activity. The total time may have been recorded by the stop watch function or manually input by the user. The tracking metrics table 303 may also include an administrative task time display that identifies a total time spent by the user for completing administrative tasks (e.g., tasks that have been designated as administrative task activities and not work task activities), as recorded by the stop watch function or manually input by the user. The tracking metrics table 303 may also include a shrinkage time display that identifies a total time spent by the user on shrinkage tasks, where shrinkage tasks may not be counted as time spent on the activities identified as the current work task activity. The shrinkage time may be recorded by the stop watch function or manually input by the user. The tracking metrics table 303 may also include a break time display that identifies a total time spent by the user on break time that may not be counted as time spent on the activities identified as the current work task activity, as recorded by the stop watch function or manually input by the user.

Figure 3B:
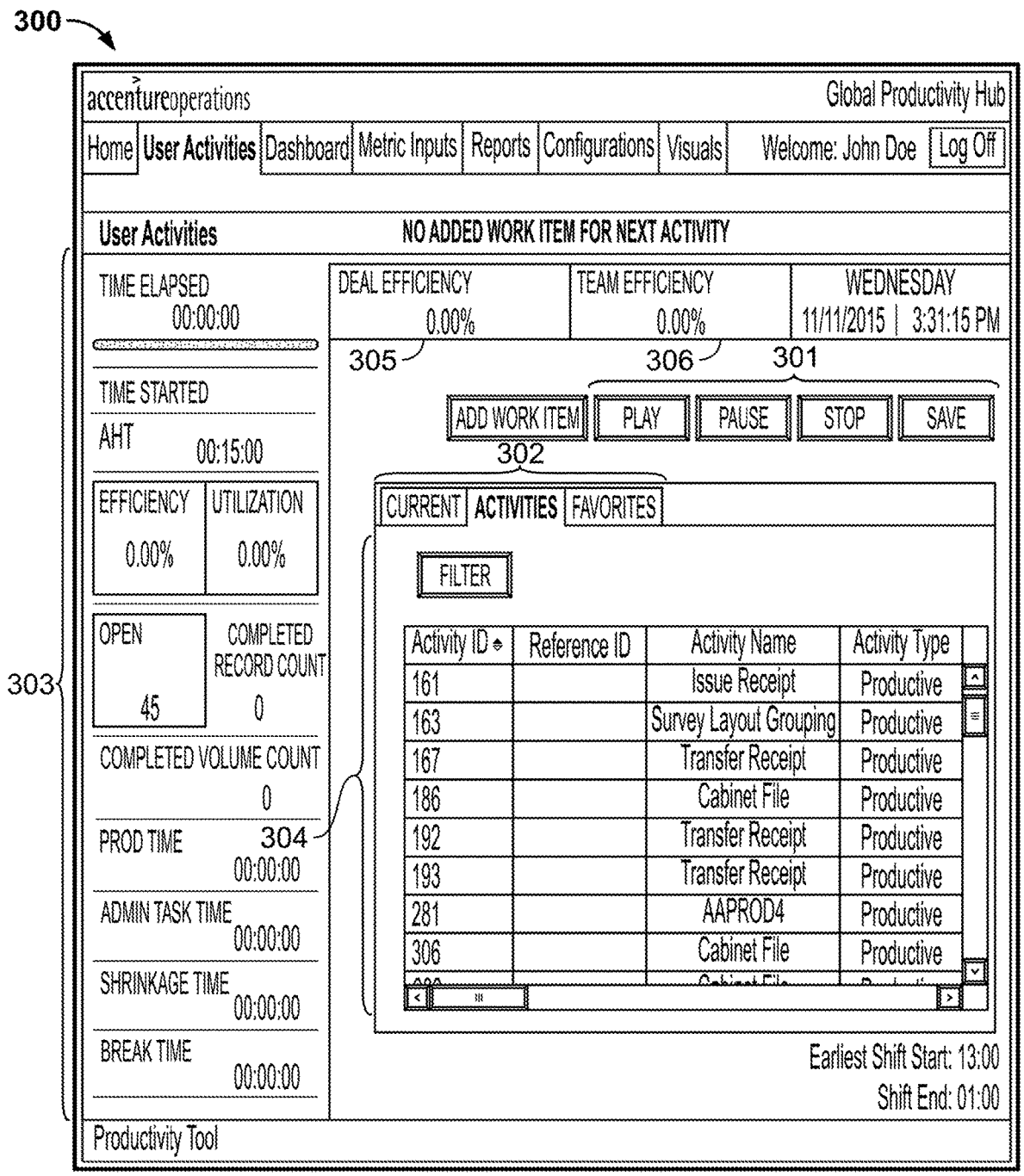
FIG. 3B illustrates an exemplary user interface of the productivity tracking application operating according to a user activities module, according to some embodiments.

FIG. 3B illustrates the exemplary user interface 300 of the productivity tracking application where the sub-operating interface 304 corresponds to the "activities" sub-operating tab. User interface 300-2 corresponds to an embodiment of the user activities module.

Specific to user interface 300 illustrated in FIG. 3B is sub-operating interface 304 corresponding to the "activities" sub-operating tab identified from the sub-operating tabs 302. The "activities" sub-operating tab may include a table identifying an activity ID, a reference ID, an activity name, and an activity type.

Figure 3C:
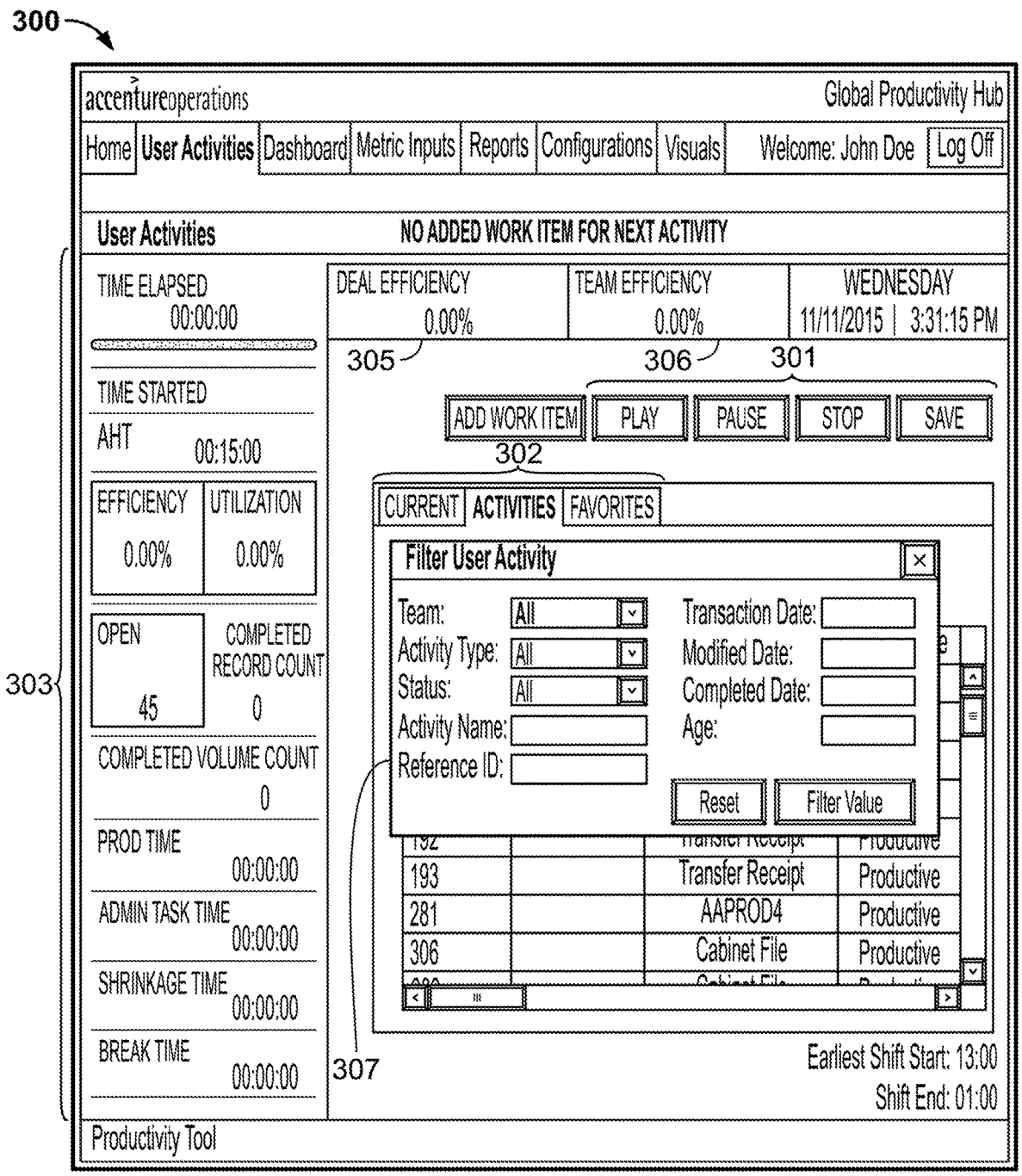
FIG. 3C illustrates an exemplary user interface of the productivity tracking application operating according to a user activities module, according to some embodiments.

The "activities" sub-operating tab may further include a filter option that enables the user to select a filter for viewing the table according to one or more of the activity ID, reference ID, activity name, or activity type. For example, FIG. 3C. illustrates a "filter user activity" control interface 307 that may be displayed when the user selects the filter option from the "activities" sub-operating tab illustrated in FIG. 3B. Included in the "filter user activity" control interface 307 is a team selection option, an activity type selection option, a status selection option, an activity name input option, a reference ID input option, a transaction date input option, a modified date input option, a completed date input option, and an age input option. By utilizing the "filter user activity" control interface 307 illustrated in FIG. 3C, the user may input one or more criteria for filtering the activities displayed within the "activities" sub-operating tab illustrated in FIG. 3B. For example, the table may be filtered to display "In progress" and/or "Completed" activities based on selection of a filter option.

Figure 3D:
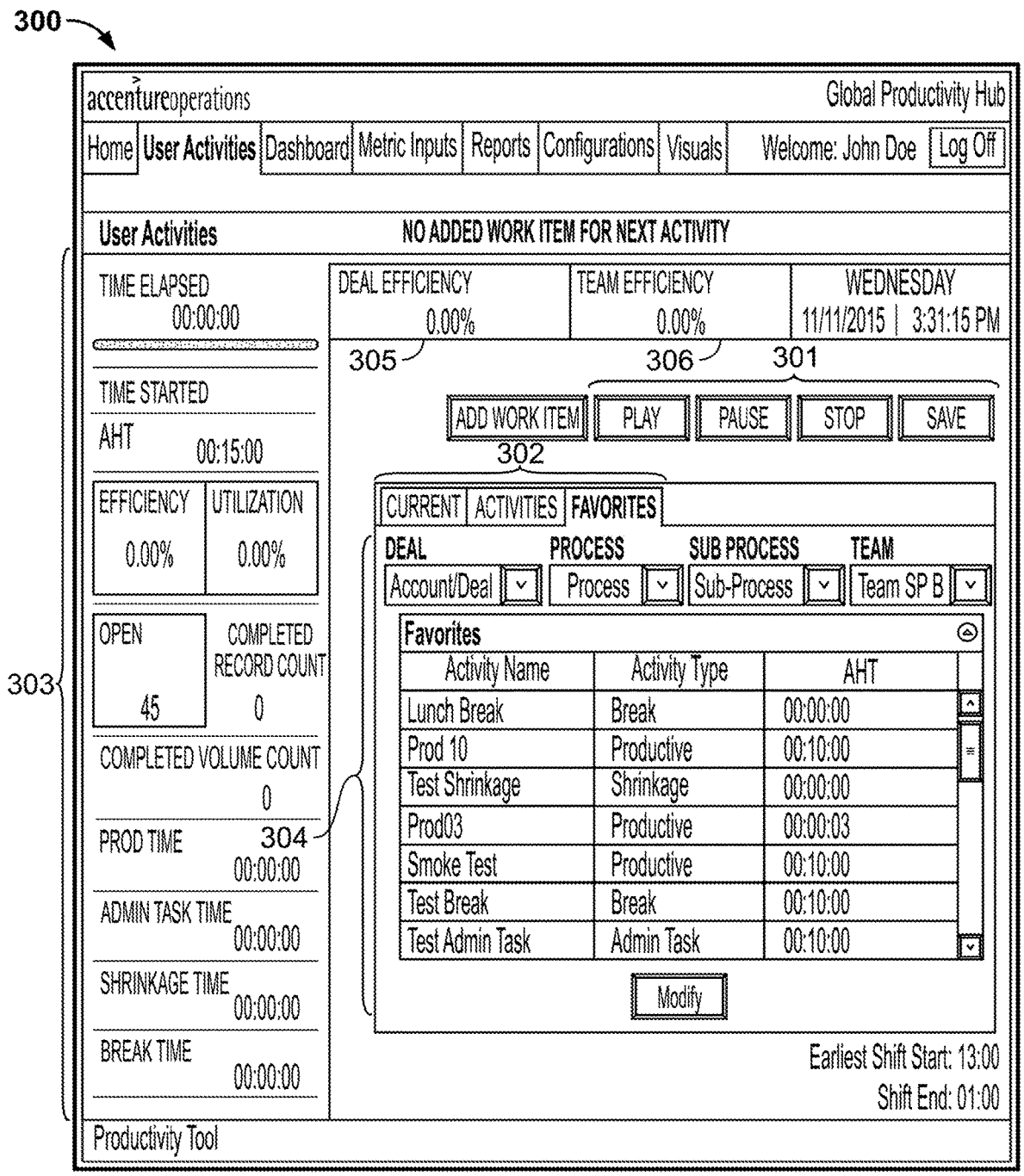
FIG. 3D illustrates an exemplary user interface of the productivity tracking application operating according to a user activities module, according to some embodiments.

FIG. 3D illustrates the exemplary user interface 300 of the productivity tracking application where the sub-operating interface 304 corresponds to the "favorites" sub-operating tab. For example, the activities listed in the favorites table displayed in sub-operating interface 304 corresponding to the "favorites" sub-operating tab may be a list of the user's frequently used activities.

Specific to user interface 300 illustrated in FIG. 3D is sub-operating interface 304 corresponding to the "favorites" sub-operating tab identified from the sub-operating tabs 302. The "favorites" sub-operating tab may include a table including activities that have been tagged as being a favorite work task activity of the user. For example, the table may identify an activity name, an activity type, and an average handling time (AHT) for favorite work task activities. The "favorites" sub-operating tab may further include a deal selection option, a process selection option, a sub-process selection option, and a team option for filtering favorite activities displayed within the table. The "favorites" sub-operating tab may also include a modify selection option.

Figure 3E:
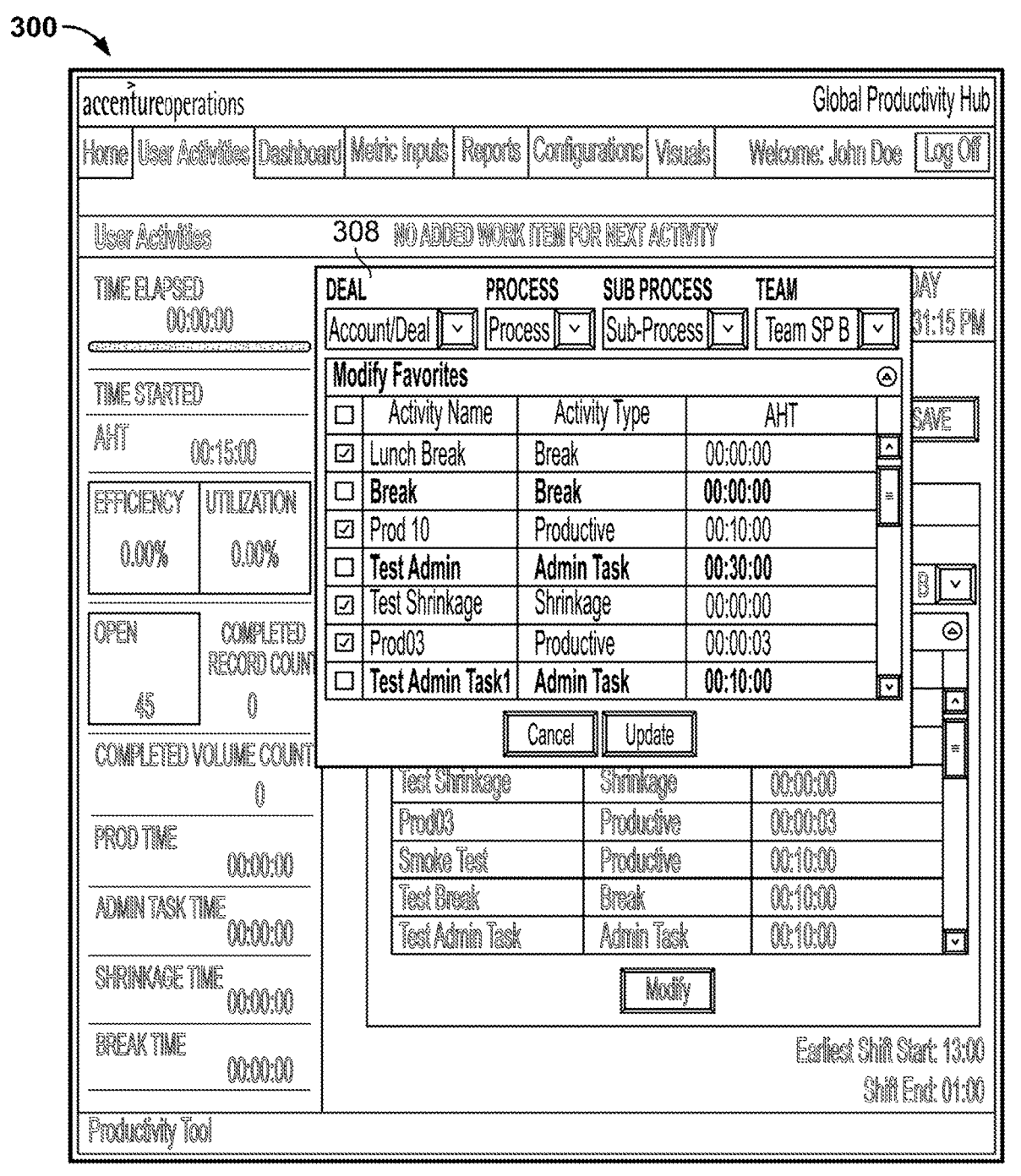

For example, by selecting the modify selection option from sub-operating interface 304, the "modify favorites" control interface 308 illustrated in FIG. 3E may be displayed. The "modify favorites" control interface 308 may include a modify favorites table that allows the user to select one or more favorited work task activities for modification. The "modify favorites" control interface 308 may further include a deal selection option, a process selection option, a sub-process selection option, and a team option for filtering favorite activities displayed within the modify favorites table.

Figure 4:
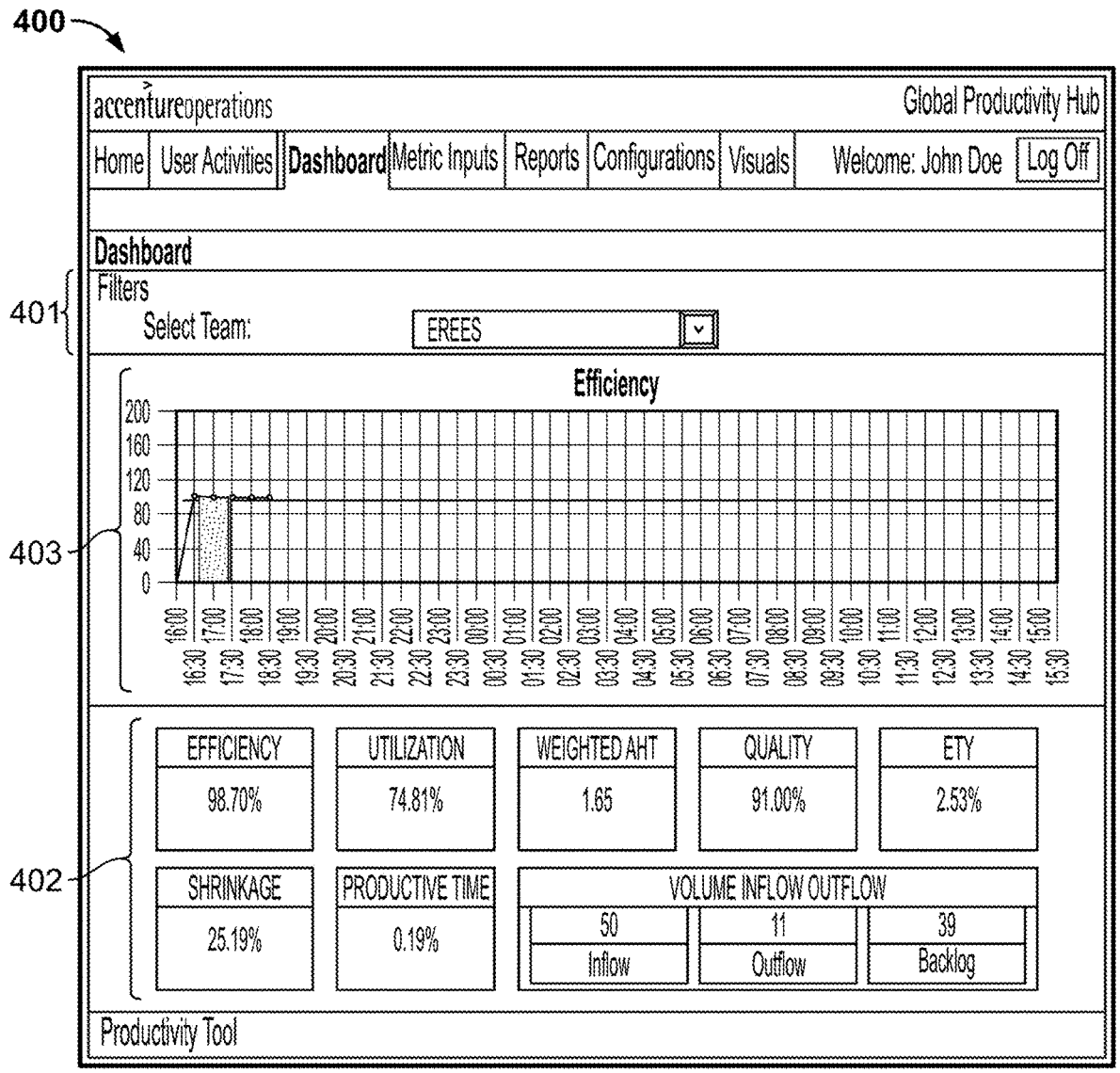
FIG. 4 illustrates an exemplary user interface of the productivity tracking application operating according to a dashboard module, according to some embodiments.

FIG. 4 illustrates an exemplary user interface 400 of the productivity tracking application that may be displayed on the user's device (e.g., agent device 110 or manager device 120) after successfully logging onto the productivity tracking application (i.e., successfully passing authentication process). As illustrated by the selection of the "dashboard" tab in FIG. 4, user interface 400 corresponds to the dashboard module.

The "dashboard" tab display illustrated in FIG. 4 includes a graph section 403 that includes a graphical representation generated by the productivity tracking application corresponding to at least one of the following productivity metrics corresponding to the user (e.g., agent): efficiency, utilization, shrinkage, productive time, weighted AHT, quality, Equivalent Throughput Yield (ETY), and volume inflow and outflow statistics for work assigned to the user. The "dashboard" tab display also includes a metrics box section 402 that numerically identifies at least one of the following metrics corresponding to the user (e.g., agent): efficiency, utilization, shrinkage, productive time, weighted AHT, quality, ETY, and volume inflow and outflow statistics for work assigned to the user. Selecting a metrics box from the metrics box section 402 will cause the productivity tracking application to display the corresponding graph in the graph section 403. The "dashboard" tab display also includes a filter selection option 401, where the user may filter the corresponding metrics information to a selected team and/or specific user. According to some embodiments, the filter selection option 401 may only be available to users that have been authenticated as a team leader or administrator. In other words, the filter selection option 401 may not be available for users logged on as an agent.

The metric calculations and variables that are available in the "dashboard" tab display illustrated in FIG. 4, or otherwise referenced or generated by the productivity tracking application described herein, may be defined as follows.

Productive Time: The productive time may be a total productive time assigned to a known entity (e.g., agent, team, project, client, etc.) according to a known unit of time (e.g., hours).

Total Logged Time in System: The total logged time in system may correspond to the total elapsed time of all activities while logged into the productivity tracking application. According to some embodiments, the total logged time in system may correspond to the total elapsed time of all activities while logged into the productivity tracking application within a particular shift.

Utilization Percentage: The utilization percentage may be based on a calculation that compares the productive time to the total logged time in system.

Productive Hours Percentage: The productive hours may be based on a calculation that compares the productive time to the total logged time in system while taking into account break times.

Shrinkage Percentage: The shrinkage percentage may be based on a calculation that compares total shrinkage time, total administrative task time, and total break time with the total logged time in system.

Quality Percentage: The quality percentage may be generated as a calculation that represents the accuracy score of a team.

Attendance Percentage: The attendance percentage may be calculated based on a comparison of a number of resources that have logged into the productivity tracking application with a total number of resources in a team.

Capacity Utilization Percentage: The capacity utilization percentage may be calculated based on a comparison of a total active time with an expected working hours and total number of resources.

Average Handle Time: The average handle time may be calculated based on a comparison of total productive time with a number of completed productive work items based on a record count.

Volume Inflow: The volume inflow may be a number of requests or transactions that arrived within a shift.

Volume Outflow: The volume outflow may be a number of completed productive items or transactions within the shift based on the volume.

Backlog (in dashboard): The backlog may be the volume inflow minus the volume outflow.

Backlog (in metrics input): The backlog may be a backlog from a previous day.

Critical Queue: The critical queue may be a target number of tasks that are meant to be completed by the end of a shift.

FIG. 5A illustrates an exemplary user interface 500 of the productivity tracking application that may be displayed on agent device 110, or manager device 120, after successfully logging onto the productivity tracking application (i.e., successfully passing authentication process). As illustrated by the selection of the "metric inputs" tab in FIG. 5A, user interface 500 corresponds to the metric inputs module. According to some embodiments, only a user logged in (i.e., authenticated) as an administrator or a team leader may access the user interface 500 corresponding to the "metric inputs" tab.

In addition, within the "metric inputs" tab there are seen to be three different sub-operation tabs: metric input, quality metrics upload, and capacity utilization (CU) % Metrics Upload. User interface 500 corresponds to the metric input sub-operation tab. Within user interface 500, the following sections are displayed: a team quality section 501, a volume section 502, and a service level agreement (SLA)/Target section.

Regarding the team quality section 501, the user may input a date, select a team, and input a team quality score assigned to the selected team for the inputted date.

Regarding the volume section 502, the user may input a date, input an inflow amount identifying a number of work tasks that were assigned for the inputted date, input a backlog amount identifying a number of work tasks assigned for the inputted date that was not completed, input a critical queue amount identifying a number of work tasks in the backlog that would be considered critical, and select a team for assigning the inputted information from the volume section 502.

Regarding the SLA/Target section 503, the user may input target values for efficiency, utilization, equivalent throughput yield (ETY), weighted average handling time (AHT), shrinkage, productive hours, capacity utilization (CU), quality, attendance, overtime, and production hours. The target values input through the SLA/Target section 503 may be used to establish the target goals to measure against an agent's actual work task activity productions. It follows that the target values input through the SLA/Target section 503 may be used to calculate the productivity metrics for an agent provided in, for example, the tracking metrics table 303 and metrics box section 402.

FIG. 5B illustrates exemplary user interface 500 of the productivity tracking application that may be displayed on agent device 110, or manager device 120, after successfully logging onto the productivity tracking application (i.e., successfully passing authentication process). More specifically, user interface 500 corresponds to the quality metrics upload sub-operation tab within the "metric inputs" tab. According to some embodiments, only a user logged in (i.e., authenticated) as an administrator or a team leader may access the user interface 500 within the "metric inputs" tab.

Within user interface 500 corresponding to the quality metrics upload sub-operation tab, the following operational tabs are available: an upload sheet operation 511, an uploaded sheet operation 512, and a skipped operation 513. The upload sheet operation 511 includes a date input feature for inputting a date, a select sheet feature that allows the user to browse for and upload pre-stored sheets (e.g., pre-stored data templates), and a submit feature for submitting the selected sheet. The uploaded sheet operation 512 may display a list of one or more pre-stored sheets that have been uploaded via the upload sheet operation 511. For the quality metrics upload sub-operation tab, the uploaded sheet operation 512 accesses a list of records from the pre-stored sheets that are valid and have been saved in a database corresponding to the global productivity hub tool (e.g., a database stored on database server 160). The skipped operation 513 accesses the list of records from the pre-stored sheets that have erroneous data and should be corrected from the pre-stored sheets before trying to upload again via the uploaded sheet operation 512.

FIG. 5C illustrates an exemplary user interface 500 of the productivity tracking application that may be displayed on agent device 110, or manager device 120, after successfully logging onto the productivity tracking application (i.e., successfully passing authentication process). More specifically, user interface 500 corresponds to the capacity utilization % Metrics Upload sub-operation tab within the "metric inputs" tab. According to some embodiments, only a user logged in (i.e., authenticated) as an administrator or a team leader may access the user interface 500-3 within the "metric inputs" tab.

Within user interface 500 corresponding to the capacity utilization % Metrics Upload sub-operation tab, the following operational tabs are available: an upload sheet operation 521, an uploaded sheet operation 522, and a skipped operation 523. The upload sheet operation 521 includes a date input feature for inputting a date, a select sheet feature that allows the user to browse for and upload pre-stored sheets (e.g., pre-stored data templates), a level operation for selecting a level to which metrics of the selected sheet will be applied, and a submit feature for submitting the selected sheet. The uploaded sheet operation 522 may display a list of one or more pre-stored sheets that have been uploaded via the upload sheet operation 521. For capacity utilization % Metrics Upload sub-operation tab, the uploaded sheet operation 522 accesses a list of records from the pre-stored sheets that are valid and has been saved in a database corresponding to the global productivity hub tool (e.g., a database stored on database server 160). The skipped operation 523 accesses the list of records from the pre-stored sheets that have erroneous data and should be corrected from the pre-stored sheets before trying to upload again via the upload sheet operation 521.

FIGS. 6A to 6F illustrates exemplary embodiments of user interface 600 of the productivity tracking application that may be displayed on the user device (e.g., agent device 110 or manager device 120) after successfully logging onto the productivity tracking application (i.e., successfully passing authentication process). More specifically, exemplary embodiments of user interface 600 correspond to various reporting pages within the reports module, as represented under the "reports" main topic tab. Within the reports module represented by the "reports" main topic tab, there may be one or more report pages. These report pages may be represented by sub-operating tabs beneath the main topic tabs. For example, the productivity tracking application may include the following report pages: main reports, dashboard reports, intraday screen, deal EOD (End of Day) report, mood meter report, administrator report, and advanced reporting. According to some embodiments, only users that have been authenticated as an administrator, team leader, or report analyst may access exemplary embodiments of user interface 600 corresponding to the reports module.

The reports that are generated within the reports module of the productivity tracking application may be generated by, for example, the report generator 153 of the productivity tracking application illustrated in the communication network system of FIG. 1. The information utilized to generate the reports described by user interface 600 may be stored on a database in communication with the productivity tracking application such as, for example, reporting server 170. The generated reports may be stored on a database such as, for example, reporting server 170. According to some embodiments, a data source upon which the report generator 153 references for operation may be referred to as a reporting database. The reporting database may be populated with data, including the generated reports, using SQL server integration services (SSIS) and/or Extract, Transform and Load (ETL) processes. The reporting database may be configured to improve productivity of the productivity tracking application, and in particular, improve productivity of the report generating tool. For example, the reporting database may aggregate data on a daily, weekly, or monthly basis which allows the reporting database to generate reports without maintaining raw resource tracking data. In anticipation of handling large amounts of data, the reporting database may implement reporting tables similar to an enterprise data warehouse (EDW) that includes fact tables and dimensions. For example, to achieve faster reporting, look-up tables of resource tracking data may be flattened into one or more dimensions. The dimensions may then be used as an ETL lookup. The dimensions may further be used for selecting and extracting data (e.g., resource tracking data) during the generation of a report, as described herein with reference to FIGS. 6A to 6F. According to some embodiments, there may only be a single ETL job process implemented per client assigned to the user. Further, to achieve faster reporting, fact tables that are flattened versions of the resource tracking data may be designed and utilized. Fact tables may be extracted on a daily basis.

A transaction archive system may be implemented to allow the user to look up previous data using an ad hoc query. Each aggregation task may be integrated into an ETL process and be executed upon successful loading of fact tables.

FIG. 6A illustrates user interface 600 corresponding to the "main reports" report page. A plurality of different reports may be generated from user interface 600 based on the selection of a report type under the selectable "report list" field illustrated in a report selection section 601 of user interface 600. For example, the user may activate the "report list" field to select one or more of the following reports for generation: 1. Attendance report: generates a report on time in/time out, overtime, and/or tardiness of an agent; 2. Active idle report: generates a report on the active times and idle times for applications or tools utilized by an agent; 3. Break report: generates a report on the number of hours an agent has taken from work task activities; 4. Efficiency report: generates a report on efficiency metrics for a selected agent(s), team, and/or deal/work project; 5. Performance report: generates a report on an agent's performance; 6. Open activities report: generates a report on open work tasks (i.e., uncompleted work tasks assigned to agent/team/deal/project) for a given agent/team/deal/project; 7. AHT report: generates a report that compares a target time or an average handling time (AHT) with the actual handling time; 8. Shrinkage report: generates a report on all shrinkage times for an agent; 9. Data output report: generates a report on all data outputs created by an agent; 10. Outlier report: generates a report on all completed activities by an agent; 11. Utilization report: generates a report on a utilization score calculated for an agent; 12. Administrative task report: generates a report on administrative task activities spend by an agent; 13. Stack ranking report: generates a report on an agent's rank based on efficiency and utilization score; 14. Weighted AHT report: generates a report that displays an average handling time (AHT) of all tasks completed by an agent based on the volume % of each task; 15. Equivalent throughput yield (ETY) report: generates a report that displays the ration between an agent's/team's normalized task volume against the agent's/team's capacity based on their work expected productive hours.

The reports may be generated for one or more agents identified or selected from the "agent" field also provided in the report selection section 601 of user interface 600.

In addition, the report may be generated for a specified date, date range, time zone, or break threshold based on inputs provided into one or more of the following fields included in a date selection section 602: 1. Date comparison field; 2. Date from field; 3. Date to field; 4. Time zone filed; and 5. Break Threshold field.

In addition, the report may be filtered based on inputs to one or more of the following fields included in a field selection section 603 included in user interface 600. Such inputs included in the field selection section 603 may include an organization selection field, a geography selection field, a country selection field, a service delivery operations (SDO)/Capability selection field, an account/deal selection field, a process selection field, a sub-process selection field, and a team selection field.

Based on selections made in the report selection section 601, the date selection section 602, and the field selection section 603, the user may generate the report through user interface 600 by activating a "generate" command button. The user may also reset inputs/selections made into the report selection section 601, the date selection section 602, and the field selection section 603 by activating a "reset" command button as illustrated in user interface 600.

Figure 6B:
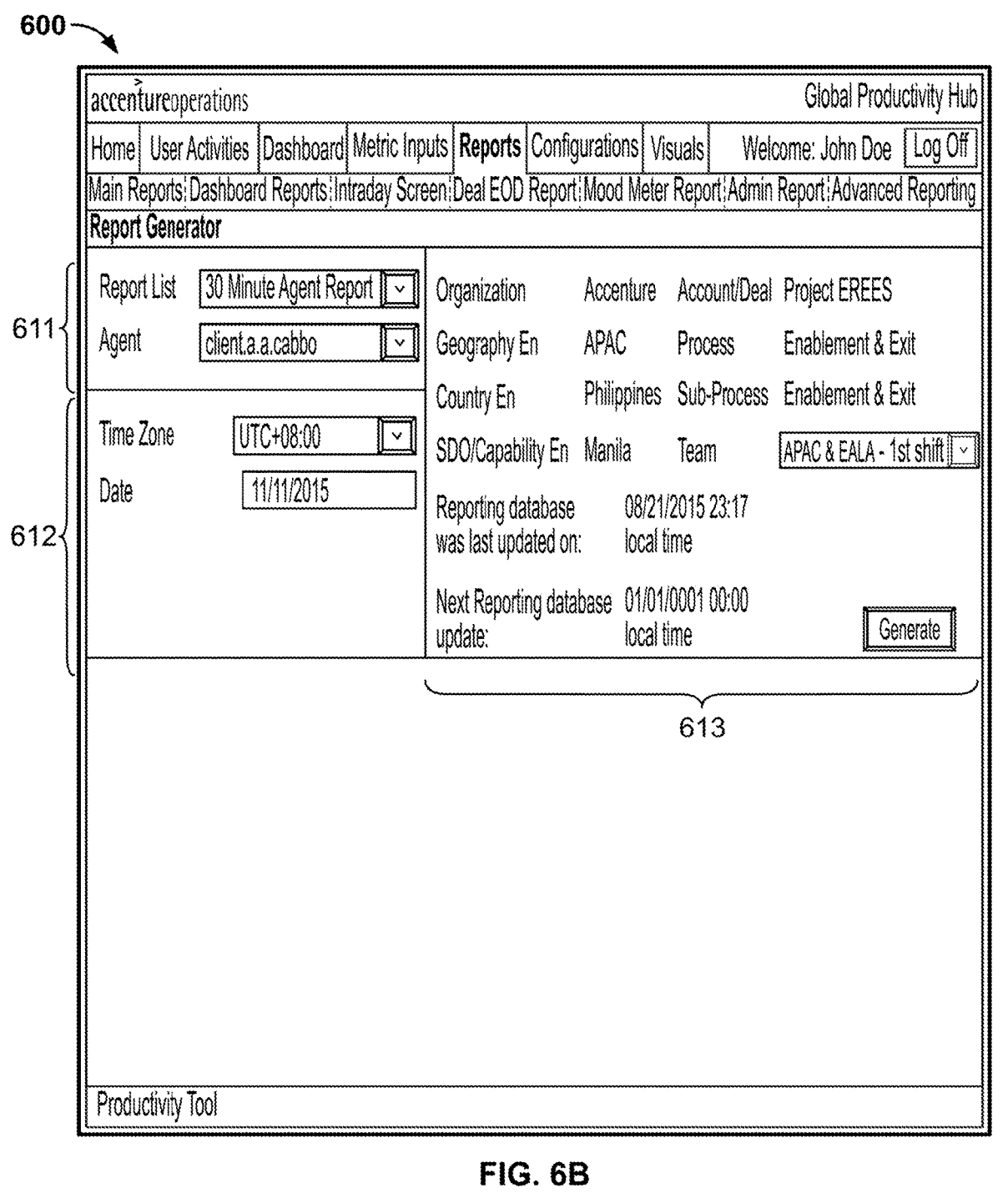

FIG. 6B illustrates user interface 600 corresponding to the "dashboard reports" report page. A plurality of different reports may be generated from user interface 600 based on the selection of a report type under the selectable "report list" field illustrated in a report selection section 611 of user interface 600. For example, the user may activate the "report list" field to select one or more of the following reports for generation: 1. 30-minute Team Report: generates a report for a team identifying a utilization score, efficiency score, productive time measurement, volume inflow/outflow measurement, and a backlog of work tasks measurement for the team; 2. 30-minute Agent Report: generates a report for an agent identifying a utilization score, efficiency score, productive time measurement, volume inflow/outflow measurement, and a backlog of work tasks measurement for the agent; 3. Quality team report: generates a report that includes a quality score calculated for a team on a specified day; 4. Quality agent report: generates a report that includes a quality score calculated for an agent on a specified day.

User interface 600 further includes a date selection section 612 that enables the user to select a time zone and input a date for generating the report.

User interface 600 further includes a field selection section 613 that may filter the report based on inputs to one or more of the following fields included in the field selection section 613 included in user interface 600. Such inputs included in the field selection section 613 may include an organization selection field, a geography selection field, a country selection field, a SDO/Capability selection field, an account/deal selection field, a process selection field, a sub-process selection field, and a team selection field. Based on selections made in the report selection section 611, the date selection section 612, and the field selection section 613, the user may generate the report through user interface 600 by activating a "generate" command button.

Figure 6C:
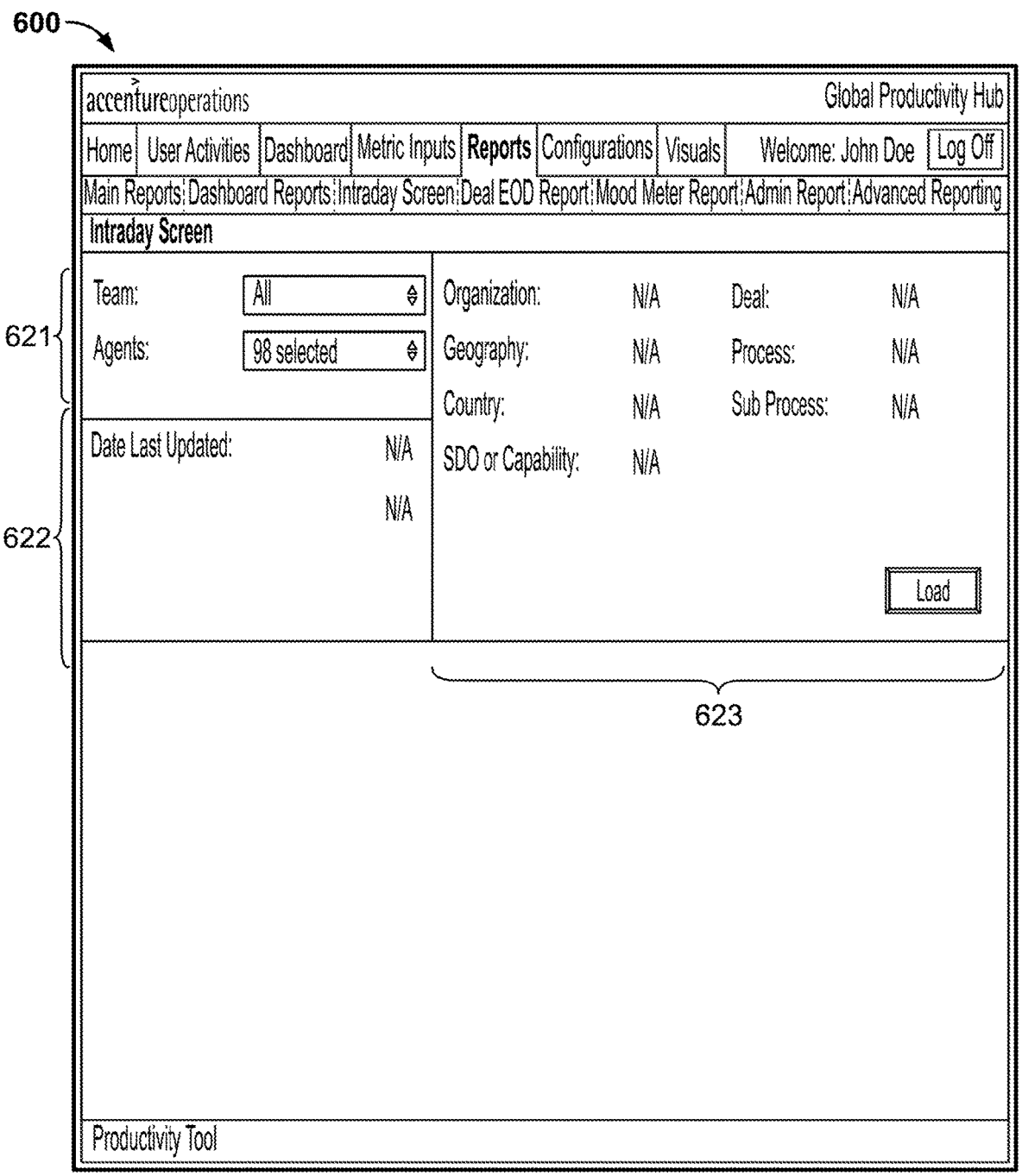
FIG. 6C illustrates an exemplary user interface of the productivity tracking application operating according to a reports module, according to some embodiments.

FIG. 6C illustrates user interface 600 corresponding to the "intraday screen" report page. Unlike some of the other report pages, the "intraday screen" report page does not generate a report. Rather, the "intraday screen" report page may be utilized by the user to obtain the latest data information to team leaders. It follows that the user interface 600 corresponding to the "intraday screen" report page may only be accessible to users that are authorized as a team leader or having a higher authorization level.

A team/agent input section 621 includes a team input field that enables the user to select one or more teams, and an agent input field that enables the user to select one or more agents. A data update section 622 identifies a date and/or time when the intraday data being obtained and displayed within user interface 600 has been updated. An intraday data display section 623 includes one or more intraday data points obtained for the team and or agent identified from the team/agent input section 621. The intraday data points displayed within the intraday data display section 623 may be obtained when the user activates a "load" command button within user interface 600-3.

Figure 6D:
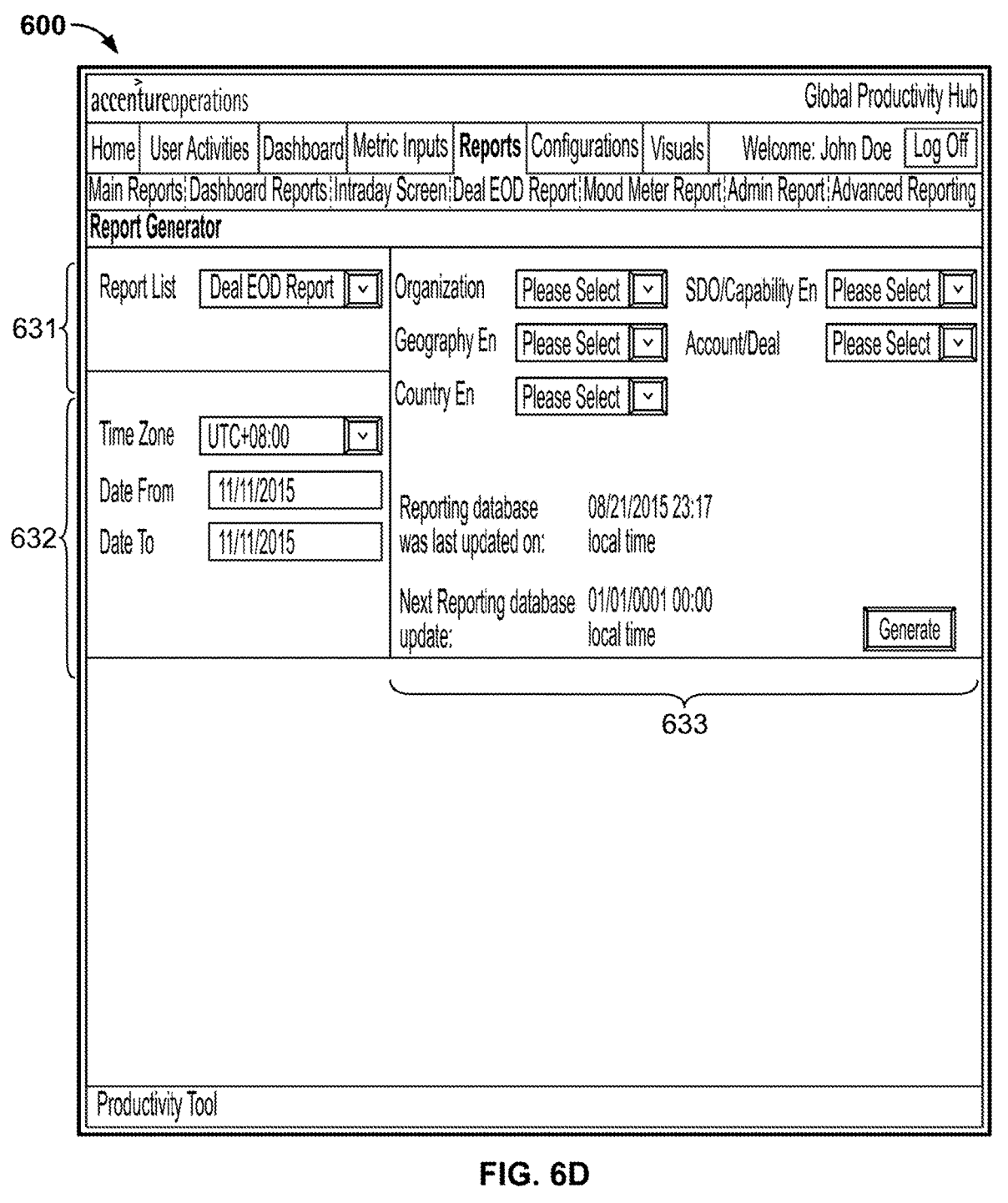

FIG. 6D illustrates user interface 600-4 corresponding to the "deal EOD report" report page. A summarized report that displays the 7 metrics may be generated from user interface 600 based on the selection of a report type under the selectable "report list" field illustrated in a report selection section 632 of user interface 600. For example, the user may activate the "report list" field to select the deal EOD report. According to some embodiments, the "deal EOD report" report page may only be accessible to users that are authorized as a team leader or having a higher authorization level.

User interface 600 further includes a date selection section 632 that enables the user to select a time zone and input a date range (date from and date to) for generating the report.

User interface 600 further includes a field selection section 633 that may filter the report based on inputs to one or more of the following fields included in the field selection section 633 included in user interface 600. Such inputs included in the field selection section 633 may include an organization selection field, a geography selection field, a country selection field, a SDO/Capability selection field, and an account/deal selection field. Based on selections made in the report selection section 631, the date selection section 632, and the field selection section 633, the user may generate the report through user interface 600 by activating a "generate" command button.

Figure 6E:
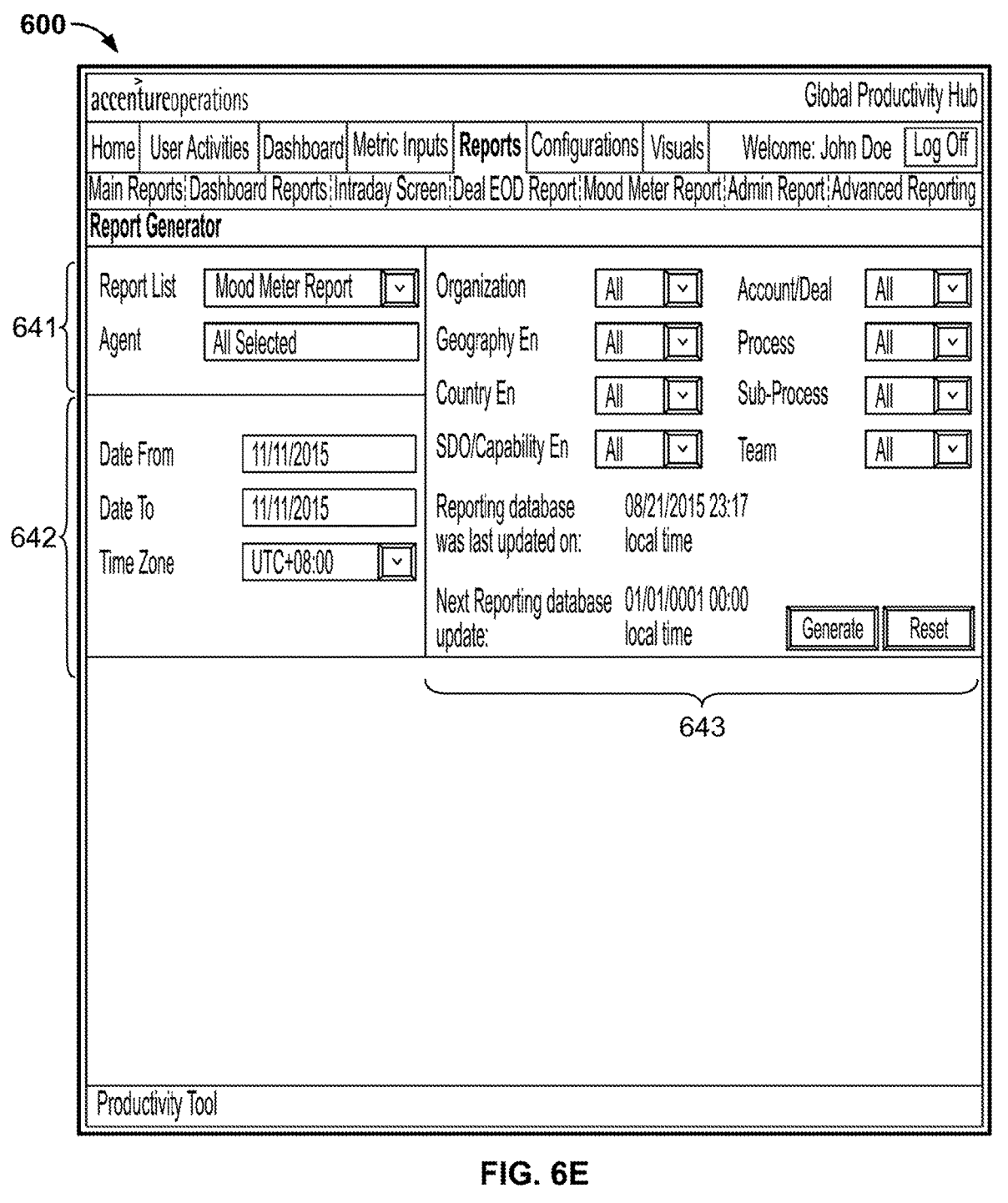

FIG. 6E illustrates user interface 600 corresponding to the "mood meter report" report page. A summarized report that shows mood information selected by the user for the day may be generated from user interface 600 based on the selection of a report type under the selectable "report list" field illustrated in a report selection section 641 of user interface 600. For example, the user may activate the "report list" field to select the summarized report. According to some embodiments, the "mood meter report" report page may only be accessible to users that are authorized as a team leader or having a higher authorization level.

User interface 600 further includes a date selection section 642 that enables the user to select a time zone and input a date range (date from and date to) for generating the report.

User interface 600 further includes a field selection section 643 that may filter the report based on inputs to one or more of the following fields included in the field selection section 643 included in user interface 600. Such inputs included in the field selection section 643 may include an organization selection field, a geography selection field, a country selection field, a SDO/Capability selection field, an account/deal selection field, a process selection field, a sub-process selection field, and a team selection field. Based on selections made in the report selection section 641, the date selection section 642, and the field selection section 643, the user may generate the report through user interface 600-5 by activating a "generate" command button. The user may also reset inputs/selections made in the report selection section 641, the date selection section 642, and the field selection section 643 by activating a "reset" command button.

Figure 6F:
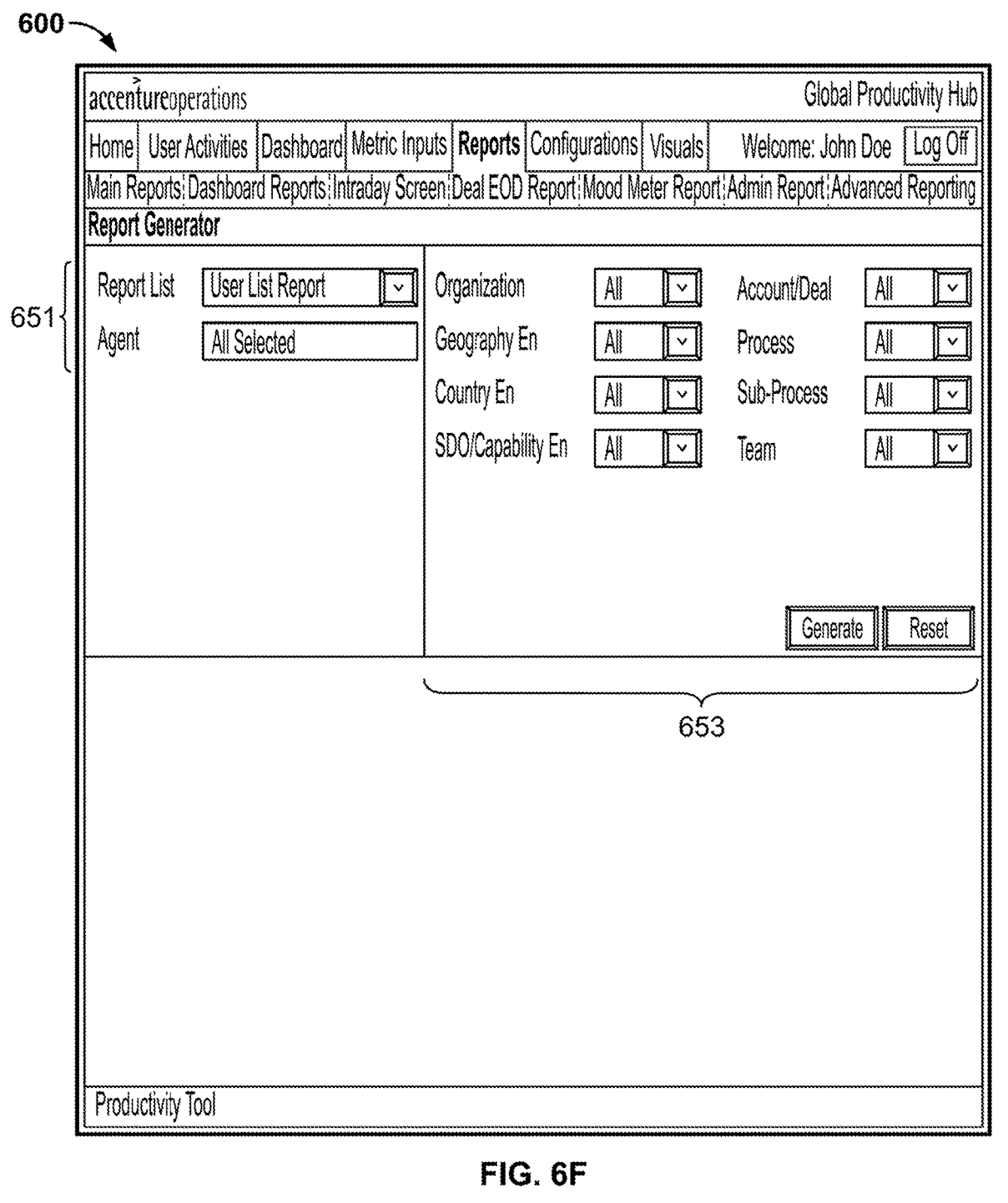

FIG. 6F illustrates user interface 600 corresponding to the "admin report" report page. A report that includes a list of current users of the productivity tracking application and their attributes (e.g., one or more of user name, residence address, dates of employment, productivity performance metric data, telephone number) may be generated from user interface 600 based on the selection of a report type under the selectable "report list" field illustrated in a report selection section 651 of user interface 600. For example, the user may activate the "report list" field to select the report. According to some embodiments, the "admin report" report page may only be accessible to users that are authorized as an administrator or having a higher authorization level.

User interface 600 further includes a field selection section 653 that may filter the report based on inputs to one or more of the following fields included in the field selection section 653 included in user interface 600-6. Such inputs included in the field selection section 653 may include an organization selection field, a geography selection field, a country selection field, a SDO/Capability selection field, an account/deal selection field, a process selection field, a sub-process selection field, and a team selection field. Based on selections made in the report selection section 651, the date selection section 652, and the field selection section 653, the user may generate the report through user interface 600-6 by activating a "generate" command button. The user may also reset inputs/selections made in the report selection section 651, the date selection section 652, and the field selection section 653 by activating a "reset" command button.

FIGS. 7A to 7F illustrate exemplary user interface 700 of the productivity tracking application that may be displayed on the user device (e.g., agent device 110 or manager device 120) after successfully logging onto the productivity tracking application (i.e., successfully passing authentication process). More specifically, user interface 700 corresponds to various reporting pages within the configuration module, as represented under the "configurations" main topic tab. According to some embodiments, only users that have been authenticated as an administrator or higher may access user interface 700 corresponding to the configuration module. The information utilized to generate the reports described by user interface 700 may be stored on a database in communication with the productivity tracking application such as, for example, database server 160.

User interface 700 illustrated in FIG. 7A corresponds to an "organization hierarchy" sub-tab that displays an organizational hierarchy page for an organization. The organization may be a client organization or employer organization. The organizational hierarchy displayed by user interface 700 corresponding to the "organization hierarchy" sub-tab may include an organization level, geography level, country level, SDO/Capability level, Account/Deal level, Process level, Sub-process level, a team level, and an agent level. The user may add an item under one or more of the levels by clicking on an opening symbol (e.g., a '+' symbol). According to some embodiments, only users authenticated as an administrator or higher may access the organizational hierarchy page included in user interface 700.

User interface 700 illustrated in FIG. 7B corresponds to an "organization master list" sub-tab that displays an organizational master list page for an organization. The organization may be a client organization or employer organization. The organizational hierarchy displayed by user interface 700 corresponding to the "organization master list" sub-tab may include an organization level, geography level, country level, Utilities/Capability level, Account/Deal level, Process level, Sub-process level, a team level, and an agent level. The user may add an item under one or more of the levels by clicking on an opening symbol (e.g., a '+' symbol). According to some embodiments, only users authenticated as an administrator, team leader, or higher may access the organizational master list page included in user interface 700.

User interface 700 illustrated in FIG. 7C corresponds to a "manage users" sub-tab that displays a manage productivity tool user's page. The manage productivity tool user's page lists all the users of the productivity tracking application. The list may include a user's employee ID, name, access role(s), and an active status. According to some embodiments, only users authenticated as an administrator, team lead, or higher may access the manage productivity tool user's page included in user interface 700.

As illustrated in user interface 700 corresponding to the "manage users" sub-tab, a new user may be created by clicking on a "create new user" command button by the user.

Clicking on the "create new user" command button may cause the productivity tracking application to display user interface 700 corresponding to an "add/edit user information" sub-tab illustrated in FIG. 7D. User interface 700 corresponding to the "add/edit user information" sub-tab displays a user add/edit page. From the user add/edit page, the user may input information into one or more of the fields included in the user add/edit page. According to some embodiments, the field of the user add/edit page that are tagged with an asterisk may be required to save the user details. According to some embodiments, only users authenticated as an administrator, team leader, or higher may access the manage productivity tool user's page included in user interface 700.

User interface 700 illustrated in FIG. 7E corresponds to an "upload people HR table" sub-tab that displays an upload people HR table page. The upload people HR table page enables the user to upload all possible users to match the users who will be added. The upload people HR table page includes an "upload sheet" tab that enables the user to browse for an upload sheet of agent information and upload the selected upload sheet. The upload people HR table page also includes an "uploaded" tab that displays one or more uploaded sheets. The upload people HR table page also includes a "skipped" tab that displays sheets and/or agents that have been skipped. According to some embodiments, only users authenticated as an administrator or higher may access the manage productivity tool user's page included in user interface 700.

Figure 7F:
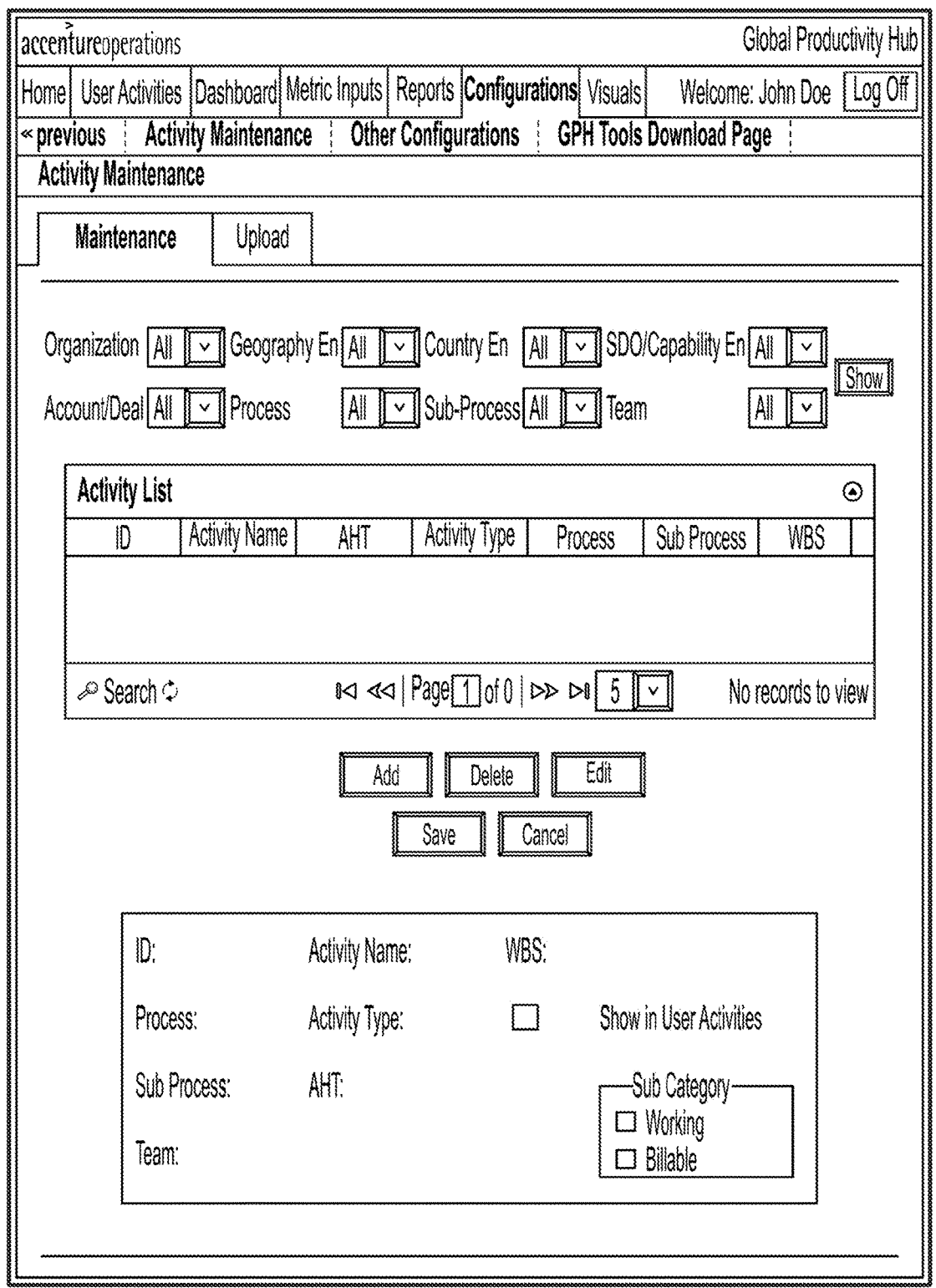
FIG. 7F illustrates an exemplary user interface of the productivity tracking application operating according to a configurations module, according to some embodiments.

User interface 700 illustrated in FIG. 7F corresponds to an "activity maintenance" sub-tab that displays an activity maintenance page. The activity maintenance page enables the user to add an activity that may later be selected by the user or another agent during the use of the productivity tracking application. Activities for the user may vary based on the team the user belongs to. The activity maintenance page may include various input fields for the user to input one or more characteristics of the new activity being added. According to some embodiments, only users authenticated as an administrator, team leader, or higher may access the manage productivity tool user's page included in user interface 700.

FIG. 8 illustrates a user interface 800 corresponding to a page within the visuals module, as represented under the "visuals" main topic tab. According to some embodiments, only users that have been authenticated as an administrator, team leader, or higher may access user interface 800 corresponding to the visuals module.

More specifically, user interface 800 corresponds to a manage display configurations page within the visuals module. The manage display configurations page enables the user to add a display profile for displaying a Visuals display (described in further detail with reference to FIGS. 9A-9C). The display items corresponding to a particular display profile may be edited and modified by the user by inputting and selecting the different information fields included in the manage display configurations page of user interface 800. The manage display configurations page may also control which processes or teams will be displayed, and the duration of each display. Each manage display configuration saved from the manage display configurations page may be referenced when viewing a Visuals display, as described with reference to FIGS. 9A to 9C.

Figure 9C:
FIG. 9C illustrates an exemplary user interface of the productivity tracking application operating according to a visuals module, according to some embodiments.

FIGS. 9A to 9C illustrates exemplary Visuals displays 910 to 930. The Visuals displays 910 to 930 may be displayed when the user selects the "display" tab from user interface 800 illustrated in FIG. 8. The contents of Visuals displays 910 to 930 will vary based on which display profile has been selected. According to most embodiments, a display profile may be configured to display three main levels: Process level (corresponding to process level Visuals display 910), Team level (corresponding to team level Visuals display 920), and Agent level (corresponding to agent level Visuals display 930). Although some embodiments may only display one or two of the three main levels, depending on the selected display profile. According to some embodiments, only users authenticated as an administrator, team leader, or above may access the Visual displays included as part of the visuals module.

FIG. 9A illustrates exemplary Visual display 910 that includes productivity metrics on a process (i.e., work task activity) level. FIG. 9B illustrates exemplary Visual display 920 that includes productivity metrics on a team level. FIG. 9C illustrates exemplary Visual display 930 that includes productivity metrics on an agent level. The display of a trend indicator (e.g., arrows pointing up, down, or sideways) may be controlled within a metrics display box illustrated in Visual display 910, Visual display 920, and/or Visual display 930, to indicate a trend (e.g., increasing metric, decreasing metric, or stable metric) for the corresponding metric. Also within Visual display 910, Visual display 920, and/or Visual display 930, a Pause/Play icon, Reverse/Fast Forward icon, and/or a skip icon may be included to provide the following functionality:

Pause—By default, when visuals have been launched, it will cycle through a series of levels (screens) to show the projects metrics. When the user activates/selects the Pause icon, it will control the visuals to retain the current screen.

Play—When the user activates/selects the Play icon, the cycle of screens will be resumed after it has been paused to a certain level (i.e., screen).

Reverse/Fast Forward—When the user activates/selects the Reverse/Fast Forward icon, the visuals may be controlled to go back or move on to the next visual or screen in the cycle.

Skip—When the user activates/selects the Skip icon, the display of screens may be controlled to skip forward to the next screen within the cycle.

Figure 10:
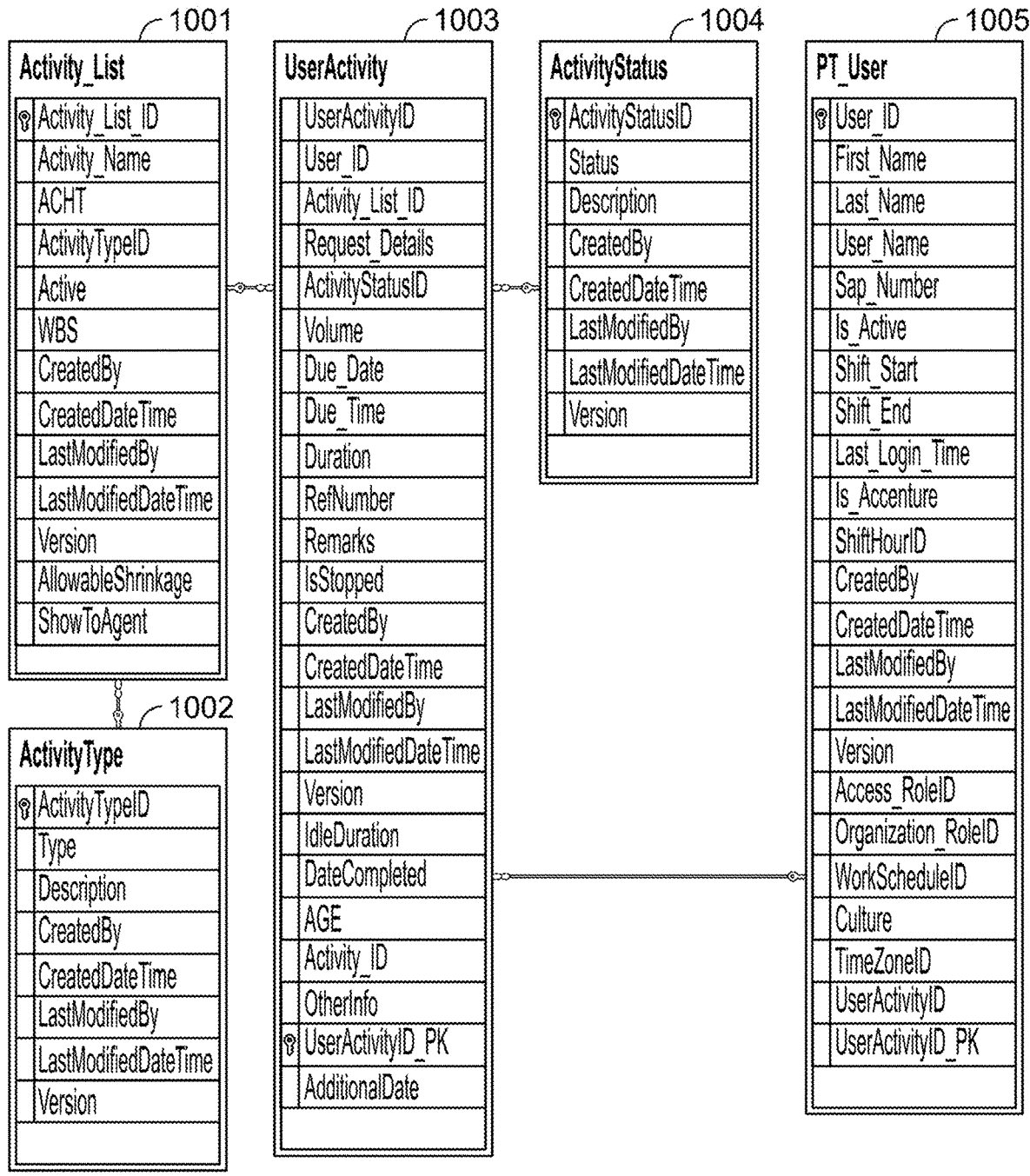
FIG. 10 illustrates exemplary tables of information stored by the productivity tracking application, according to some embodiments.

FIG. 10 illustrates exemplary tables of data that may be stored in a relational database 1000 (e.g., database server 160) in communication with the productivity tracking application described herein. The data contained in the tables may be referenced during the implementation of the productivity tracking application.

For example, relational database 1000 may store Activity_List table 1001 that includes all activities that a user can see and pick, including, but not limited to, an activity name, average handling time, and the activity type ID that associates the activity to the Activity_List table 1001. Relational database 1000 may also store Activity_Type table 1002 that includes information defining the different classifications of each activity such as, but not limited to, a productive activity, a shrinkage activity, an administrative task activity, and a break activity. Relational database 1000 may also store UserActivity table 1003 that includes every work item that a user creates along with its corresponding work item value. Relational database 1000 may also store ActivityStatus table 1004 that includes a status (e.g., Completed or In progress) for each activity identified by the productivity tracking application.

Figure 11:
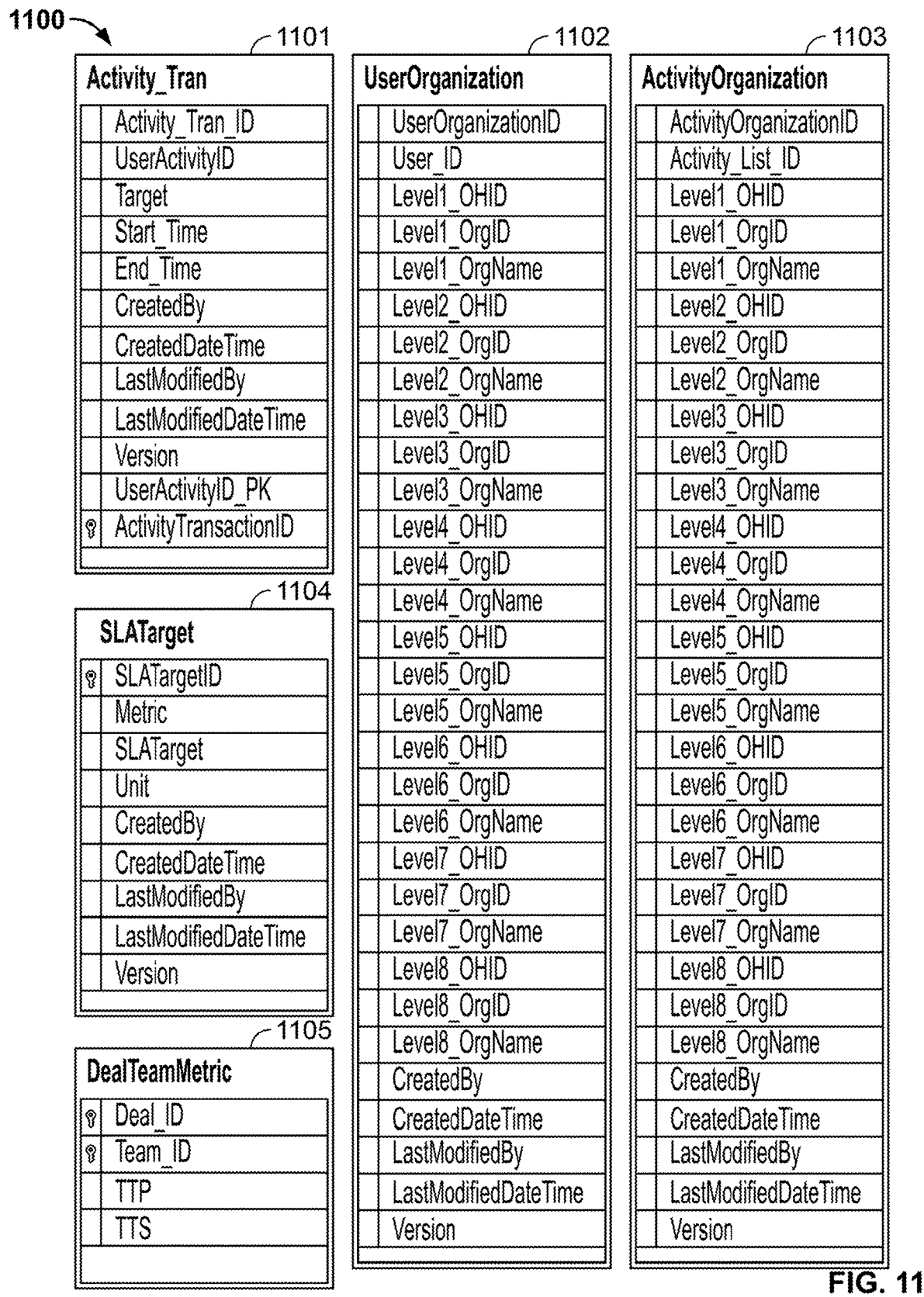
FIG. 11 illustrates exemplary tables of information stored by the productivity tracking application, according to some embodiments.

FIG. 11 illustrates exemplary tables of data that may be stored in a relational database 1100 (e.g., database server 160) in communication with the productivity tracking application described herein. The data contained in the tables may be referenced during the implementation of the productivity tracking application.

For example, relational database 1100 may store Activity_Tran table 1101 that includes start and stop time information corresponding to use of the stop watch function during tracking of a work task activity. Relational database 1100 may also store UserOrganization table 1102 that includes information identifying organizational hierarchy information that may be referenced by the productivity tracking application (e.g., the organization of specific agents with specific teams). Relational database 1100 may also store ActivityOrganization table 1103 that may include information identifying specific activities to specific organizations. Relational database 1100 may also store SLATarget table 1104 that may include target metric information for one or more productivity metric assigned to one or more user (e.g., agent, manager, administrator, team lead, team) of the productivity tracking application. Relational database 1100 may also store DealTeamMetric table 1105 that may include a summarized table that includes the raw data to be used on computing the deal and team efficiency.

Figure 12:
FIG. 12 illustrates exemplary tables of information stored by the productivity tracking application, according to some embodiments.
Figure 13:
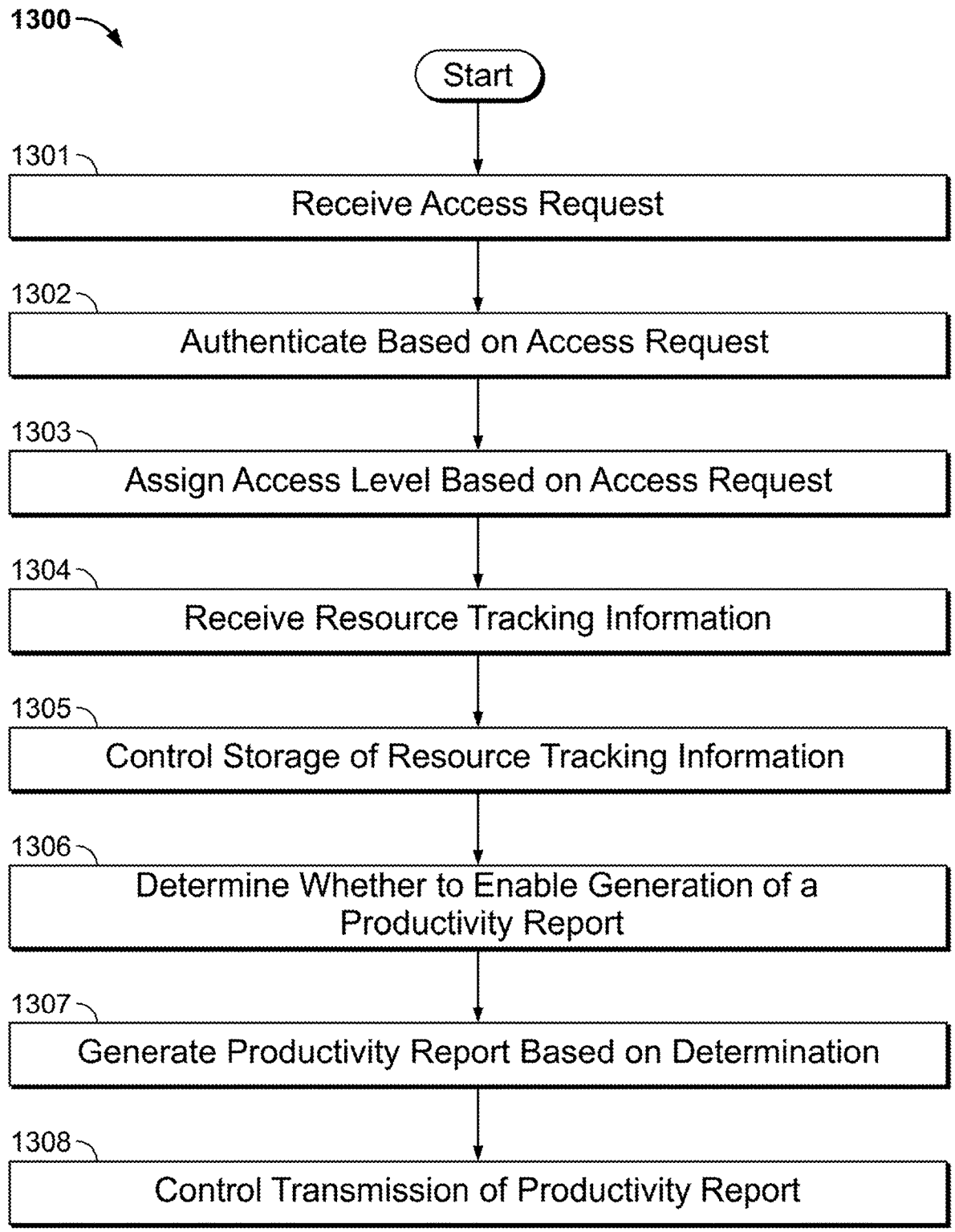
FIG. 13 illustrates a flow chart describing an exemplary process for the productivity tracking application, according to some embodiments.

FIG. 12 illustrates exemplary tables of data that may be stored in a relational database 1200 (e.g., database server 160) in communication with the productivity tracking application described herein. The data contained in the tables may be referenced during the implementation of the productivity tracking application.

For example, relational database 1200 may store Organization_Mst table 1201 that includes information defining each level of the organization and entries that are specific to each level by using the LevelID. Relational database 1200 may also store Quality table 1102 that includes the quality metric information for users on a specific day that was uploaded to the productivity tracking application (e.g., uploaded via quality bulk upload). Relational database 1200 may also store PT_User table 1203 that may include information defining a user's dashboard display based on a role assigned to the user. Relational database 1200 may also store TeamQuality table 1204 that may include the quality metric information for a team on a specific day that was uploaded to the productivity tracking application (e.g., uploaded via quality bulk upload). Relational database 1200 may also store Attendance table 1205 that may include a record of user's sign in and sign out from the productivity tracking application which may be used as a measure of the user's attendance.

FIG. 1300 illustrates a flow chart 130 describing an exemplary process of operation of the productivity tracking application described herein.

At 1301, the productivity tracking application may receive an access request from a user device (e.g., agent device 110 or manager device 120) being operated by a user. The access request may include authentication information corresponding to the user and/or user device. The access request may also include access level information corresponding to the user and/or user device. The access request may also include attribute information corresponding to the user (e.g., name, address, employee ID, resource ID) and/or user device (e.g., device ID, device certificate, device screen size).

At 1302, the productivity tracking application authenticates access to the productivity tracking application based on information included in the access request. For example, the user and/or user device may be authenticated according to any one or more of the authentication processes described herein.

At 1303, the productivity tracking application assigns an access level to the user and/or user device based on information included in the access request (e.g., access level information). For example, the user and/or user device may be assigned an access level according to any one or more of the processes for assigning an access level described herein.

At 1304, the productivity tracking application receives resource tracking information. For example, the productivity tracking application may receive resource tracking information according to any one or more of the processes for receiving resource tracking information described herein.

At 1305, the productivity tracking application controls storage of the received resource tracking information. For example, the productivity tracking application may control storage of the received resource tracking information according to any one or more of the processes for controlling storage of the received resource tracking information described herein.

At 1306, the productivity tracking application determines whether to enable generation of a productivity report. For example, the productivity tracking application may determine whether to enable generation of a productivity report according to any one or more of the processes for determining whether to enable generation of a productivity report described herein.

1307, the productivity tracking application generates the productivity report based on the determination. For example, the productivity tracking application may generate the productivity report according to any one or more of the processes for generating the productivity report described herein.

At 1308, the productivity tracking application controls transmission of the productivity report back to the user device that transmitted the access request. For example, the productivity tracking application may control transmission of the productivity report according to any one or more of the processes for controlling transmission of the productivity report described herein. For example, the productivity tracking application may include instructions for controlling display of the productivity report on the user device with the transmission of the productivity report.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or use the processes described in connection with the presently disclosed subject matter, e.g., through the use of an API, reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to using aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be spread across a plurality of devices. Such devices might include personal computers, network servers, and handheld devices, for example.

What is claimed is:

1. A resource tracking server comprising:
   an interface configured to communicate with a computing device and a database;
   a memory configured to store instructions for running a resource productivity tracking application; and
   a processor configured to communicate with the interface and the memory, the processor further configured to execute the instructions for running the resource productivity tracking application to:
   initiate, via communication received from the computing device, access to the resource productivity tracking application by an agent resource using the computing device to log-in into the resource productivity tracking application;
   monitor computing activity on the computing device while the agent resource is logged into the resource productivity tracking application from the computing device, wherein the computing activity to be monitored is selectively defined by the agent resource through a first user interface of the resource productivity tracking application;
   store the computing activity as resource tracking information in the database;
   receive an access request, the access request including access level information corresponding to a requesting resource;
   determine an access level for the requesting resource based on the access level information;
   enable access to the database according to the determined access level;
   retrieve, from the database, the resource tracking information;
   generate a productivity report and executable display instructions to include display fields according to the determined access level, wherein the display fields included in the productivity report are selectively defined by the requesting resource through a second user interface of the resource productivity tracking application, wherein the display fields that are selectable through the second user interface are preset based on the determined access level of the requesting resource, and wherein the productivity report includes the resource tracking information and the executable display instructions;
   transmit the productivity report to the computing device, wherein the productivity report is configured to display on the computing device to include the display fields according to the determined access level;

receive a user selection of a set of attributes through a third user interface of the productivity tracking application to define a display profile setting; and control the productivity report to be displayed as a plurality of visual displays each selectable by a user, wherein in response to the display profile setting, each selected visual display is sequentially displayed for a user selected duration and the executable display instructions cause the productivity report to automatically cycle through the selected visual displays.

2. The resource tracking server of claim 1, wherein the productivity report further includes resource productivity target information, wherein the resource productivity target information corresponds to the agent resource alone, a group to which the agent resource is allocated, or a work project to which the agent resource is assigned.

3. The resource tracking server of claim 1, wherein the productivity report includes at least one of an efficiency metric, a utilization metric, a shrinkage metric, or a productive time metric of the resource.

4. The resource tracking server of claim 1, wherein the resource tracking information comprises at least one of time spent on productive work related activities, time spent on shrinkage related activities, or time spent on break related activities.

5. The resource tracking server of claim 1, wherein the productivity report further comprises resource productivity target information including at least one of an efficiency target, a utilization target, an equivalent throughput yield target, a weighted average handling time target, a shrinkage time target, a productive time target, a capacity utilization target, a quality target, an attendance target, an overtime target, and a production time target.

6. The resource tracking server of claim 1, wherein the processor is further configured to execute the instructions for running the resource productivity tracking application to:

enable storage of resource productivity target information into the memory when the determined access level corresponding to the requesting resource satisfies a predetermined level.

7. The resource tracking server of claim 6, wherein the predetermined level may be an administrator level.

8. The resource tracking server of claim 1, wherein the processor is further configured to execute the instructions for running the resource productivity tracking application to:

authenticate the requesting resource based on authentication information included in the access request; and store at least a portion of the resource productivity tracking application into a cache memory portion of the memory when the requesting resource is authenticated.

9. The resource tracking server of claim 1, wherein the processor is further configured to execute the instructions for running the resource productivity tracking application to:

enable changes to configuration settings of the resource productivity tracking application when the determined access level corresponding to the requesting resource satisfies a predetermined level.

10. The resource tracking server of claim 9, wherein the predetermined level may be an administrator level.

11. A method of tracking resource productivity, the method comprising:

initiating, via communication received via a communications interface from a computing device, access to a productivity tracking application being executed by a processor by an agent resource using the computing device to log-in into the productivity tracking application;

receiving a user selection of a first set of attributes through a first user interface of the productivity tracking application to identify a computing activity to be monitored;

monitoring, via the processor, the computing activity on the computing device while the agent resource is logged into the productivity tracking application from the computing device, wherein the computing activity to be monitored is selectively defined by the agent resource through a first user interface of the resource productivity tracking application;

storing the computing activity as resource tracking information in a;

receiving an access request, the access request including access level information and authentication information corresponding to a requesting resource;

determining, via the processor, an access level for the requesting resource based on the access level information;

enabling access, through communication via the communications interface, to the database according to the determined access level;

retrieving, via the processor from the database, the resource tracking information;

receiving a user selection of a second set of attributes through a second user interface of the productivity tracking application to define display fields to be included in a productivity report, wherein attributes that are selectable through the second user interface are preset based on the determined access level of the requesting resource;

generating, via the processor, a productivity report to include the defined display fields, wherein the processor generates executable display instructions that when executed by the processor generate the display fields included in the productivity report that are selectively defined by the requesting resource through the second user interface of the resource productivity tracking application, wherein the display fields that are selectable through the second user interface are preset based on the determined access level of the requesting resource, and wherein the productivity report includes the resource tracking information and the executable display instructions;

transmitting the productivity report via the communications interface to the computing device, wherein the productivity report is configured to display on the computing device to include the defined display fields, receiving a user selection of a third set of attributes through a third user interface of the productivity tracking application to define a display profile setting; and controlling, via the processor, the productivity report to be displayed as a plurality of visual displays each selectable by a user, wherein in response to the display profile setting, each selected visual display is sequentially displayed by the processor for a user selected duration based on the display profile settings, whereby the processor executing the executable display instructions causes the productivity report to automatically cycle through the selected visual displays.

12. The method of claim 11, wherein the productivity report further includes resource productivity target information, wherein the resource productivity target information corresponds to the agent resource alone, a group to which the agent resource is allocated, or a work project to which the agent resource is assigned.

13. The method of claim 11, wherein the productivity report includes at least one of an efficiency metric, a utilization metric, a shrinkage metric, or a productive time metric of the resource.

14. The method of claim 11, wherein the resource tracking information comprises at least one of time spent on productive work related activities, time spent on shrinkage related activities, or time spent on break related activities.

15. The method of claim 11, wherein the productivity report further comprises resource productivity target information including at least one of an efficiency target, a utilization target, an equivalent throughput yield target, a weighted average handling time target, a shrinkage time target, a productive time target, a capacity utilization target, a quality target, an attendance target, an overtime target, and a production time target.

16. The method of claim 11, further comprising:
enabling storage of resource productivity target information into the database when the determined access level corresponding to the requesting resource satisfies a predetermined level.

17. The method of claim 11, further comprising:
enabling changes to configuration settings of the productivity tracking application when the determined access level corresponding to the requesting resource satisfies a predetermined level.

18. The method of claim 17, wherein the predetermined level may be an administrator level.

19. A resource tracking system comprising:
a computing device configured to:
collect resource tracking information corresponding to an agent resource;
a productivity tracking server configured to communicate with the computing device and a database storing the resource tracking information, the productivity tracking server further configured to:
initiate, via communication received from the computing device, access to the productivity tracking application by the agent resource using the computing device to log-in into the productivity tracking application;
monitor computing activity on the computing device while the agent resource is logged into the productivity tracking application from the computing device, wherein the computing activity to be monitored is selectively defined by the agent resource through a first user interface of the productivity tracking application;
store the computing activity as the resource tracking information in the database;
enable access to the database when an access level for a requesting resource is determined to be above a predetermined level;
receive resource tracking information from the computing device;
control storage of the resource tracking information in the database;
generate a productivity report and executable display instructions for the agent resource, wherein the executable display instructions include display fields according to a determined access level of the requesting resource, wherein the display fields included in the productivity report are selectively defined by the requesting resource through a second user interface of the productivity tracking application, wherein the display fields that are selectable through the second user interface are preset based on the determined access level of the requesting resource, and wherein the productivity report includes the resource tracking information and the executable display instructions;
control transmission of the productivity report to the computing device, wherein the productivity report is configured to display on the computing to include the display fields according to the determined access level;
receive a user selection of a set of attributes through a third user interface of the productivity tracking application to define a display profile setting; and
control the productivity report to be displayed as a plurality of visual displays each selectable by a user, wherein in response to the display profile setting, each selected visual display is sequentially displayed for a user selected duration and the executable display instructions cause the productivity report to automatically cycle through the selected visual displays.

20. The resource tracking system of claim 19, wherein the productivity tracking server is further configured to:
control storage of the productivity report into the database.

* * * * *

UNITED STATES PATENT AND TRADEMARK OFFICE
CERTIFICATE OF CORRECTION

PATENT NO. : 10,878,351 B2  
APPLICATION NO. : 14/991604  
DATED : December 29, 2020  
INVENTOR(S) : Jonathan C. Arellano et al.

Page 1 of 1

It is certified that error appears in the above-identified patent and that said Letters Patent is hereby corrected as shown below:

In the Claims

Column 26, Claim 11, Line 15, insert --database-- between "a" and ";"

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*